United States Patent [19]
Enyedy et al.

[11] Patent Number: 5,796,067
[45] Date of Patent: Aug. 18, 1998

[54] PLASMA ARC TORCHES AND METHODS OF OPERATING AND TESTING THE SAME

[75] Inventors: Edward A. Enyedy, Eastlake; Steven R. Sumner, Chardon, both of Ohio

[73] Assignee: The Lincoln Electric Company

[21] Appl. No.: 550,008

[22] Filed: Oct. 30, 1995

[51] Int. Cl.⁶ .................................................. B23K 10/00
[52] U.S. Cl. .......................... 219/121.52; 219/121.57; 219/121.55; 219/121.51; 219/121.59
[58] Field of Search .................... 219/121.39, 121.44, 219/121.54, 121.57, 121.48, 75, 121.51, 121.55, 121.59; 313/231.21, 231.31

[56] References Cited

U.S. PATENT DOCUMENTS

| | | | |
|---|---|---|---|
| 3,004,189 | 10/1961 | Giannini | 315/111 |
| 3,242,305 | 3/1966 | Kane et al. | 219/75 |
| 4,567,346 | 1/1986 | Marhic | 219/121.39 |
| 4,788,408 | 11/1988 | Wlodarczyk et al. | 219/121.49 |
| 4,791,268 | 12/1988 | Sanders et al. | 219/121.57 |
| 4,814,577 | 3/1989 | Dallavalle et al. | 219/121.57 |
| 4,896,016 | 1/1990 | Broberg et al. | 219/121.5 |
| 4,902,871 | 2/1990 | Sanders et al. | 219/121.49 |
| 5,164,569 | 11/1992 | Porra et al. | 219/121.57 |
| 5,208,441 | 5/1993 | Broberg | 219/121.52 |

*Primary Examiner*—Mark H. Paschall
*Attorney, Agent, or Firm*—Vickers, Daniels & Young

[57] ABSTRACT

A plasma arc torch comprises relatively displaceable electrode and nozzle components having first and second positions relative to one another in which the electrode respectively contacts the nozzle and is spaced an operating distance therefrom. Arrangements are disclosed for relatively displacing the electrode and nozzle between the first and second positions thereof with a pre-determined force of engagement therebetween in the first position, and without having to interrupt the flow of arc gas and/or the flow of arc current during such relative displacement. A torch start up safety test procedure is performed by sequentially displacing the electrode and nozzle between the two positions thereof, sensing for appropriate open and closed circuit conditions therebetween, and enabling the creation of a pilot arc only when a pre-determined sequence of circuit conditions is sensed. Sequential displacement of the electrode and nozzle together with the application of a pre-determined force of engagement therebetween promotes cleaning of oxides from the area of contact between the electrode and nozzle.

84 Claims, 13 Drawing Sheets

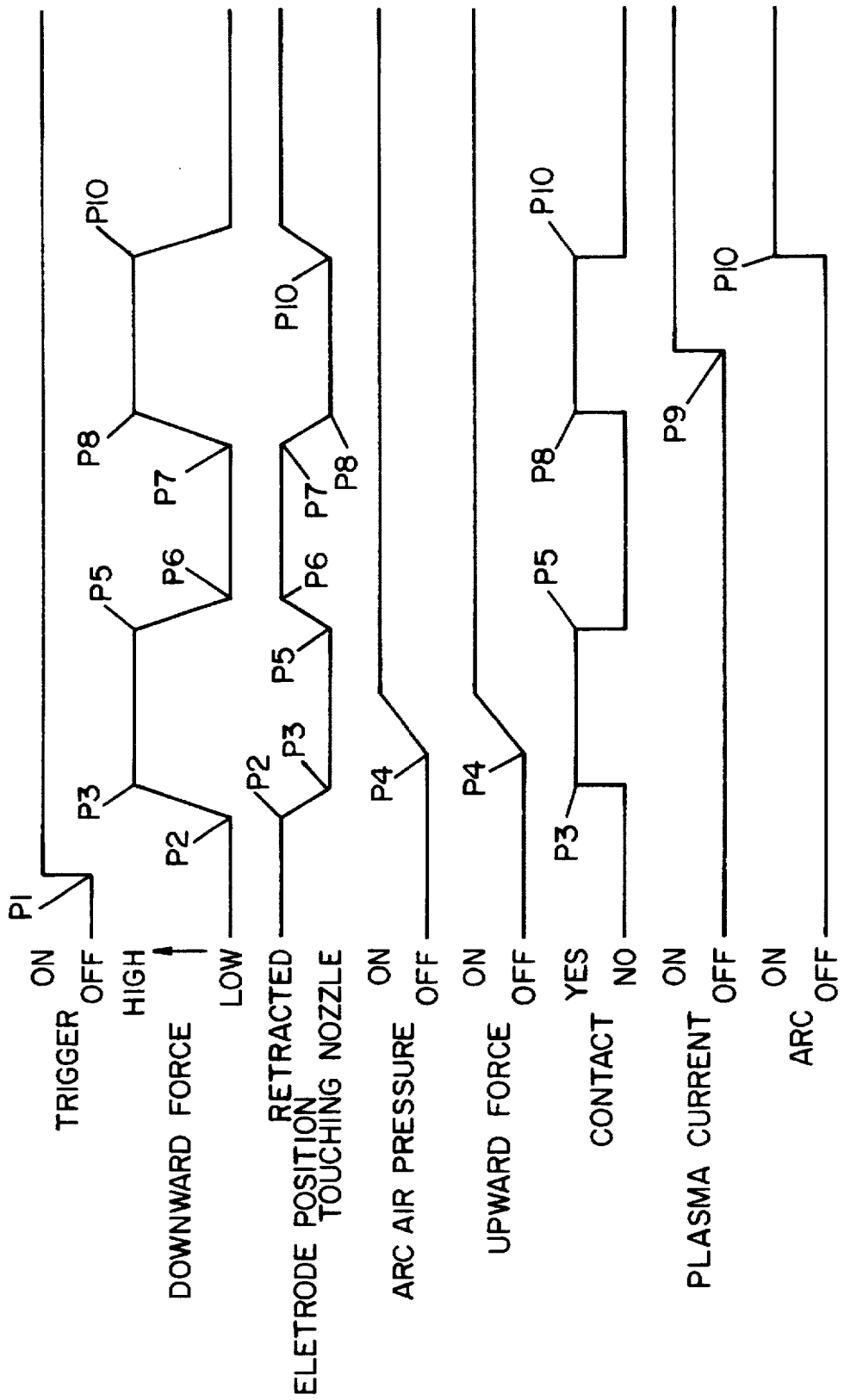

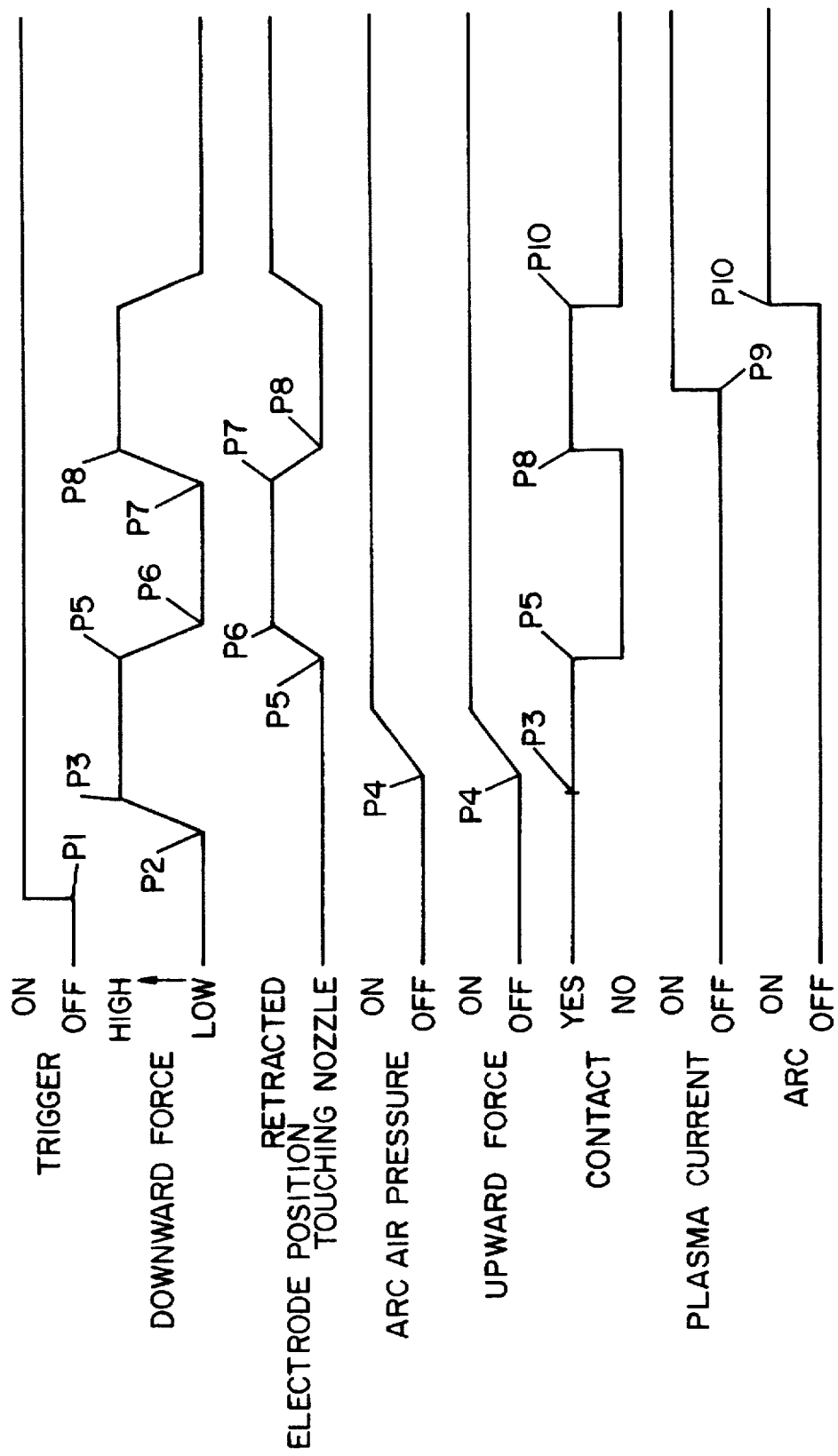

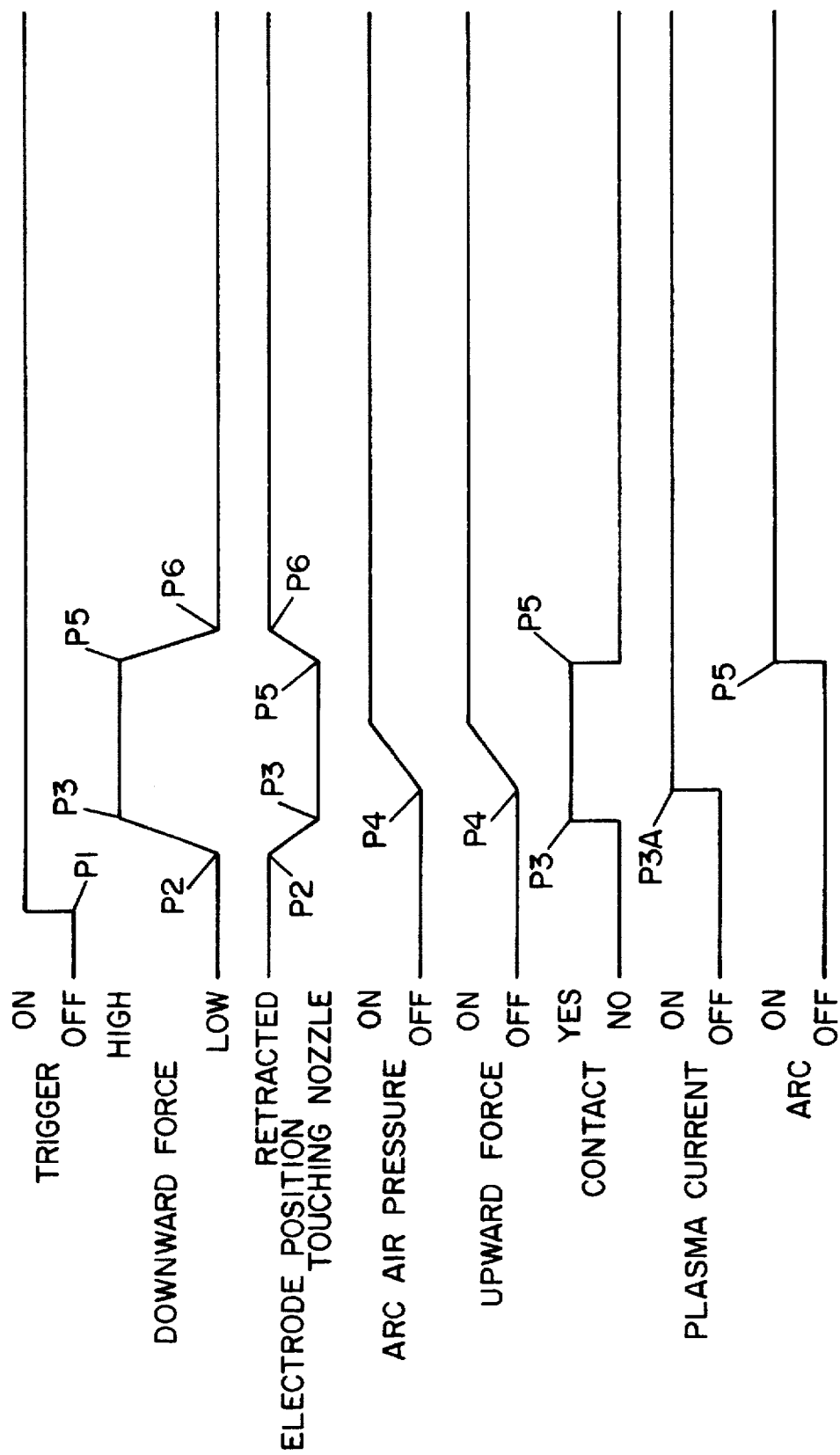

$F_s + F_{A1} = F_D$
$F_{A2} = F_u$
$F_{A2} \gg F_s$
$\underline{F_{A1} + F_s \gg F_{A2}}$ EXAMPLE  $F_s = 1^{\#}$
$F_{A1} = 5^{\#}$
$F_{A2} = 3^{\#}$

PLASMA ARC TORCHES AND METHODS OF OPERATING AND TESTING THE SAME

BACKGROUND OF THE INVENTION

The present invention relates to the art of plasma arc torches and, more particularly, to improvements in connection with the starting and re-starting of such torches as well as the preliminary testing and cleaning and the efficient and safe operation thereof.

It is of course well known that a plasma arc torch comprises an electrode and a nozzle which are relatively displaceable between a position in which the electrode contacts the nozzle and a position in which the electrode is spaced an operating distance from the nozzle. The nozzle provides a pilot arc chamber having a plasma outlet opening and, when the electrode contacts the nozzle, an arc current is flowed between the electrode and nozzle, a plasma or arc gas is supplied to the pilot arc chamber, and a pilot arc is created as the electrode moves away from the nozzle to its operating position. As the electrode moves away from the nozzle, it uncovers the plasma outlet opening, whereby a plasma jet is emitted from the nozzle providing for the torch to operate in a non-transferred pilot arc mode. By moving the nozzle into proximity with the workpiece, the arc is transferred thereto and the torch then operates in the arc-transferred mode which is preferred for cutting metal.

Many arrangements have been provided heretofore for relatively displacing the electrode and nozzle for creating the pilot arc, and a number of such arrangements are shown, for example, in U.S. Pat. Nos. 3,004,189 to Giannini; 3,242,305 to Kane et al; 4,791,268 to Sanders et al; 4,896,016 to Broberg et al; 4,902,871 to Sanders et al; 5,164,569 to Porra et al; and 5,208,441 to Broberg, which patents are incorporated herein by reference for purposes of background information. In the two patents to Sanders et al and the patent to Porra et al, the initial position of the electrode is the position in which the electrode contacts the nozzle and displacement of the electrode from contact with the nozzle to create the pilot arc requires use of the arc gas flowing toward the pilot arc chamber as the primary source of power for displacing the electrode relative to the nozzle. More particularly, in these arrangements the electrode is structurally associated with a piston against which the pressurized arc gas is applied to force the electrode away from the nozzle against the biasing force of a spring by which the electrode is moved into engagement with the nozzle when the arc gas is shut off to de-pressurize the piston chamber. In the patent to Broberg, the initial position of the electrode is that in which the electrode contacts the nozzle, and displacement of the electrode away from the nozzle is achieved through a piston and cylinder arrangement separate from and connected to the electrode through a mechanical linkage arrangement. In Broberg, the supply of arc gas to the torch is tapped to provide the motive fluid for displacing the piston against the bias of a spring which operates through the linkage arrangement to return the electrode into contact with the nozzle when the piston chamber is de-pressurized. In one embodiment shown in Kane et al, the initial position of the electrode is the operative position thereof in which the electrode is spaced from the nozzle, and the electrode is associated with a piston by which the electrode is displaced into contact with the nozzle by applying the arc gas against one side of the piston. Such displacement is against the return bias of a spring by which the electrode returns to its initial position when the piston chamber is de-pressurized. The pilot arc is created during the latter movement of the electrode, and cooling water under pressure is imposed on the opposite side of the piston to hold the electrode in the operative position during operation of the torch.

Arrangements of the foregoing character have a number of disadvantages. In this respect, for example, in the patents to Sanders et al and the patents to Porra et al and Broberg at least the arc gas supply if not both the latter and the arc current circuit must be interrupted in order to begin a new pilot cycle. Thus, if the arc is unintentionally extinguished during operation of the torch, the torch cannot be re-started without interrupting arc gas flow. This undesirably increases the cycle time for creating the pilot arc in that, following arc extinction, the operator must wait for the gas supply to shut off and for the power source for the torch to be reactivated and for the gas supply to come back to operating pressure before the pilot arc can be started again. A further disadvantage resides in the fact that, for a realistically sized torch, the available active surface area for the piston is limited such that the spring that forces the electrode against the nozzle must be of a low force. Thus, if the electrode does not touch the nozzle with sufficient force, a pilot arc may not be created because of a build-up of oxides on the electrode and/or nozzle. The limited pressure of the arc gas also limits the latter spring force. Moreover, with the arangmenets in the two patents to Sanders et al and the patent to Broberg, it is impossible to have a pre-flow fo arc gas such as for cleaning the nozzle-electrode area, or a post-flow of arc gas, such as for cooling the nozzle-electrode area.

In the embodiment of Kane et al referred to, restarting of the torch requires interrupting the power supply in order to evacuate the cooling water from the piston chamber so that the electrode can be displaced into contact with the nozzle. Accordingly, the same undesirably long cycle time attaches to this arrangement in Kane et al. In Broberg et al, a lever and over-center spring mechanism provides for manual displacement of the electrode from its initial position in contact with the nozzle during generation of the pilot arc, and the over-center spring holds the electrode in its operative position. Release of the over-center spring mechanism snaps the electrode back to its position engaging the nozzle and, while the impact of the electrode with the nozzle provides a cleaning action, release of the over-center spring mechanism requires interruption of the torch power supply. Such interruption is also required to intentionally extinguish the arc at the end of a working operation. Therefore, restarting of the torch following unintentional extinction of the arc requires interruption of the power supply and thus an increase in the cycle time between successive starts. Furthermore, it is impossible to have a pre-flow of arc gas prior to initiating generation of the arc, or to have a post-flow of arc gas following an intentional extinction of the arc. Still further, the lever and over-center spring mechanism of Broberg et al, like the lever and piston arrangement of Broberg, require a considerable number of structural components in addition to the electrode, and a disposition of many of the components laterally of the electrode and nozzle axes. Such structural complexity results in an undesirable amount of friction between the moving parts and the potential for the application of side thrust in connection with displacement of the electrode, all of which can affect the ease and reliability of electrode movement.

In Giannini, the electrode in its initial position contacts the nozzle and is spring biased thereagainst, and a solenoid connected to the power source for the torch is operable to displace the electrode away from the nozzle during generation of the arc. Intentional extinction of the arc requires interrupting the power supply whereupon the electrode returns to its initial position engaging the nozzle. Restarting of the torch following an unintentional extinction of the arc also requires interrupting the current source so that the electrode returns to its initial position. Thus, the cycle time for restarting is undesirably high, and there can be no pre-flow or post-flow of arc gas prior to generating the pilot arc or following intentional extinction of the arc.

In another embodiment shown in Kane et al. the electrode is spring biased into contact with the nozzle and cooling water for the nozzle and electrode acts against a piston connected to the electrode to displace the electrode from contact with the nozzle and against the spring bias during generation of the pilot arc. Return of the electrode to its initial position by the biasing spring requires interruption of the power supply in order to reduce the cooling water pressure. Accordingly, restarting of the torch following an unintentional extinction of the arc requires interruption of the power supply and this, together with the time required for reducing the water pressure, results in an undesirably high cycle time between successive starts of the torch. Furthermore, it is not possible to have a pre-flow of arc gas prior to generating the pilot arc or a post-flow following intentional extinction of the arc in that the latter requires interruption of the power supply and thus return of the electrode into contact with the nozzle.

Other problems attendant to the starting and operation of plasma arc torches heretofore available relate to the breaking up and removal of oxide build-up on the electrode and/or nozzle to assure good electrical contact between the latter in connection with generating a pilot arc, and the ability to efficiently, effectively and economically perform a preliminary safety check to assure that the nozzle is in place on the torch and is in proper assembled relationship with the torch body and thus the electrode. Such a safety check is desirable to prevent the operator of the torch from getting accidentally shocked such as by contacting a tool with the electrode if the latter is exposed such as would be the situation if the nozzle is not in place on the torch. At the same time, no or improper contact of the electrode with the nozzle may occur if the nozzle is on the torch but improperly oriented relative to the electrode. The latter can result in the inability to generate a starting arc and/or damage to the nozzle and/or electrode during arc generation as a result of the improper electrical contact therebetween. Heretofore, arrangements for sensing the presence of the nozzle on a torch has required various contacts, springs and the like separate from and in addition to the torch operating components.

SUMMARY OF THE INVENTION

In accordance with the present invention, the foregoing and other disadvantages and problems encountered in connection with plasma arc torches heretofore available are advantageously minimized or overcome. More particularly in this respect, and in accordance with one aspect of the invention, the electrode and nozzle components of a torch are relatively displaceable between initial and second positions so as to provide, selectively, for pre-flow and/or post-flow of arc gas and so as to enable restarting of a torch following unintentional extinction of the arc without interrupting the power supply or the flow of arc gas to the pilot arc chamber, thus to minimize the cycle time between successive starts. The initial position of the electrode may be either the position in which the electrode contacts the nozzle or the position in which the electrode is spaced an operating distance therefrom and, in either event, the electrode can be displaced from the latter position to contact the nozzle without interrupting the flow of arc gas to the pilot arc chamber, thus to facilitate restarting the torch in the event the arc is unintentionally extinguished during a cutting operation. More particularly in this respect, an operating force for relatively displacing the nozzle and electrode from its operative position into contact with the nozzle is operable independent of the flow of arc gas to the pilot arc chamber and independent of the arc current power supply. The operating force may, for example, be provided by an electro-mechanical device such as a solenoid, an operating gas source acting against a piston and which source can be separate from the arc gas source or tapped therefrom. Further, the operating force can be provided in the latter manner in combination with a spring, and can be provided as well by other devices capable of imparting relative displacement between the electrode and nozzle such as thermally expandable and contractible memory wire, thermally responsive bi-metal disks and the like. Advantageously, the component or components by which the operating force is applied are arranged co-axially with respect to the electrode and nozzle axes, thus optimizing reliability of electrode movement relative to the nozzle and the ability to overcome dirt and minimize friction between moving parts of the torch.

Further in accordance with this aspect of the invention, the operating force can be of a pre-determined magnitude which advantageously pushes or impacts the electrode against the nozzle so as to break up any oxide build up on either one or both of the electrode and nozzle components. Moreover, the engaging force promotes good electrical contact and thus optimizes generation of a pilot arc upon separation of the electrode from the nozzle with arc current applied therebetween. Advantageously, the magnitude of the engaging force between the electrode and nozzle can be several times greater than that possible with prior art arrangements wherein the engaging force is limited substantially to that of a biasing spring or a force generated by the arc gas, both of which are limited as a result of the required working pressure of the arc gas and the relatively small size of the electrode. Still further in accordance with this aspect of the invention, the electrode and nozzle can be relatively displaced into and out of contact with one another a number of times prior to generating the starting arc, thus to optimize the cleaning operation and, advantageously, such multiple displacement can be achieved with a flow of arc gas to the pilot arc chamber so as to carry particles of the broken up oxide out of the pilot arc chamber through the plasma outlet opening in the nozzle. Such displacement capability with the flow of arc gas to the pilot arc chamber and without generating a starting arc upon relative displacement of the electrode and nozzle out of engagement with one another is enabled by providing for the relative displacement between the electrode and nozzle to be independent of the arc current power supply and by providing for the force component by which the electrode engages the nozzle to either overcome the force by which the electrode is displaced away from the nozzle or by removing the latter force. As mentioned hereinabove, the force applying arrangements are co-axial with the electrode and nozzle whereby the foregoing capabilities and advantages are achieved while minimizing the usage of space within the torch body.

In accordance with another aspect of the invention, a system is provided for performing a preliminary safety check or test by which generation of a pilot arc is enabled only if the nozzle is mounted on the torch and properly oriented relative to the electrode, thus to protect an operator from being accidentally shocked and to preclude operation of the torch until it is safe to do so. Further in accordance with this aspect of the invention, the safety check is performed using the electrode and nozzle as primary components of the test, thus eliminating the need for modifying the structure of the torch to accommodate testing. Minimal testing is achieved in accordance with the invention by positioning the electrode to contact the nozzle, applying a test voltage between the nozzle and electrode and sensing for a closed circuit condition which will exist only if the nozzle is on the torch and properly positioned for contact with the electrode and the electrode and/or nozzle are free of any oxide build up which would preclude a closed circuit condition. If a closed circuit condition is sensed, the system enables the flow of arc current between the electrode and nozzle, whereby a pilot arc is generated upon relative displacement of the electrode and nozzle away from one another. If a closed circuit condition is not sensed, the system prevents the flow of arc current between the electrode and nozzle. Once the condition precluding the sensing of a closed circuit is corrected, contact of the nozzle and electrode will result in the sensing of a closed circuit and operation of the torch will be enabled.

A safety check in accordance with this aspect of the invention can be made when the initial position of the electrode is spaced from the nozzle or in contact therewith. If the electrode is initially spaced from the nozzle, the electrode and nozzle can be relatively displaced for the electrode to engage the nozzle at which time the test voltage is applied therebetween in the foregoing manner. Preferably, however, the test procedure includes sensing for an open circuit condition when the electrode is initially spaced from the nozzle and enabling the generation of a pilot arc only if an open circuit is sensed followed by the sensing of a closed circuit when the electrode contacts the nozzle. Furthermore, when the initial position of the electrode is the position in which the electrode contacts the nozzle it is preferred to sequentially relatively displace the electrode and nozzle from the initial position to the spaced position and then back to the initial position, sequentially sensing for closed, open and closed circuit conditions, and enabling the generation of a pilot arc only if the appropriate sensed circuit conditions correspond to the sequence of electrode and nozzle positions. Assuming the torch nozzle to be removed, such a closed-open-closed test requirement would be extremely difficult if not impossible for an operator to duplicate such as by shorting the electrode to nozzle connection with a tool. Similarly, with the initial position of the electrode being the position in which the latter is spaced from the nozzle, it is preferred to sequentially relatively displace the electrode and nozzle from the initial position at least twice to the position of contact with the nozzle, thus to perform an open-closed-open-closed test which would be impossible to duplicate. Further in connection with any of such testing procedures, further protection against an operator accidentally duplicating the test is preferably achieved by timing the sensed circuit condition or conditions. In any event, it will be appreciated that the electrode and nozzle can be relatively displaced into and out of engagement any number of times with a pre-determined sequence of open and closed circuit conditions being required to be sensed in order to enable generation of a pilot arc.

In accordance with yet another aspect of the invention, testing in the foregoing manner can be achieved independent of or in conjunction with cleaning of the electrode-nozzle area of contact as described above. In this respect, for example, the electrode and nozzle can be pulsed for the electrode to contact the nozzle one or more times to remove any build up of oxide on the nozzle and/or electrode, after which the test procedure would be initiated. Such a preliminary cleaning would optimize obtaining a closed circuit condition upon contact between the nozzle and electrode during the test procedure. At the same time, however, it will be appreciated that in conjunction with performing a safety test, the pulsing of the electrode and nozzle between the positions of engagement and disengagement will cause any build up of oxide to be broken up and therefore, that the required current condition signal or signals to enable starting of the torch will eventually be sensed.

It is accordingly an outstanding object of the present invention to provide improvements in connection with the starting, restarting of a plasma arc torch and the efficient and safe operation thereof.

Another object is the provision of a plasma arc torch wherein electrode and nozzle components are relatively displaceable between a position of contact and a position in which the electrode is spaced an operating distance from the nozzle without having to interrupt the arc current supply or the flow of arc gas to the plasma arc chamber of the torch.

Yet another object is the provision of a plasma arc torch wherein restarting of the torch following arc extinction can be achieved without having to interrupt the arc current or the flow of arc gas to the pilot arc chamber.

Still another object is the provision of a plasma arc torch wherein the electrode and nozzle can be relatively displaced into engagement with a predetermined engaging force therebetween and which force has a magnitude greater than that which can be applied when the arc gas supplied to the pilot arc chamber in combination with a biasing spring controls relative displacement of the electrode and nozzle between the engaged and disengaged positions thereof.

Still another object is the provision of a plasma arc torch capable of selectively enabling pre-flow and post-flow of arc gas to the pilot arc chamber independent of the arc current power supply.

A further object is the provision of a plasma arc torch wherein relative displacement of the electrode and nozzle from an operating position of the electrode to a position in which the electrode contacts the nozzle is achieved by overcoming or eliminating the force by which the electrode and nozzle are maintained in the operating position of the electrode and without having to interrupt the flow of arc gas or the flow arc current to overcome or eliminate the maintaining force.

A further object is the provision of a plasma arc torch with improved ability for breaking up the build up of oxides on the electrode and/or nozzle components.

A further object is the provision of a plasma arc torch in which the electrode and nozzle components are adapted to be relatively displaced into and out of engagement independent of the generating of a pilot arc to provide for cleaning the area of contact between the electrode and nozzle prior to initiating operation of the torch.

Yet a further object is the provision of an improved method and system for testing a plasma arc torch for the presence of a nozzle thereon and/or appropriate orientation of the nozzle relative to the torch electrode.

Another object is the provision of a method and system of the foregoing character which employs the electrode and nozzle as primary components in the test system.

Still another object is the provision of a method and system of the foregoing character which is operable to control the flow of arc current to the electrode and nozzle and which is operable to enable generation of a pilot arc only in response to the occurrence of a predetermined test parameter.

Still another object is the provision of a plasma arc torch in which the electrode and nozzle are relatively displaceable between positions of contact and separation and are operable in a manner which avoids the time heretofore required for arc gas and/or arc current power recovery between sequential starts of the torch.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIGS. 4–7 are pattern graphs illustrating the occurrence of various functions which take place during different test formats;

DESCRIPTION OF PREFERRED EMBODIMENTS

Figure 1:
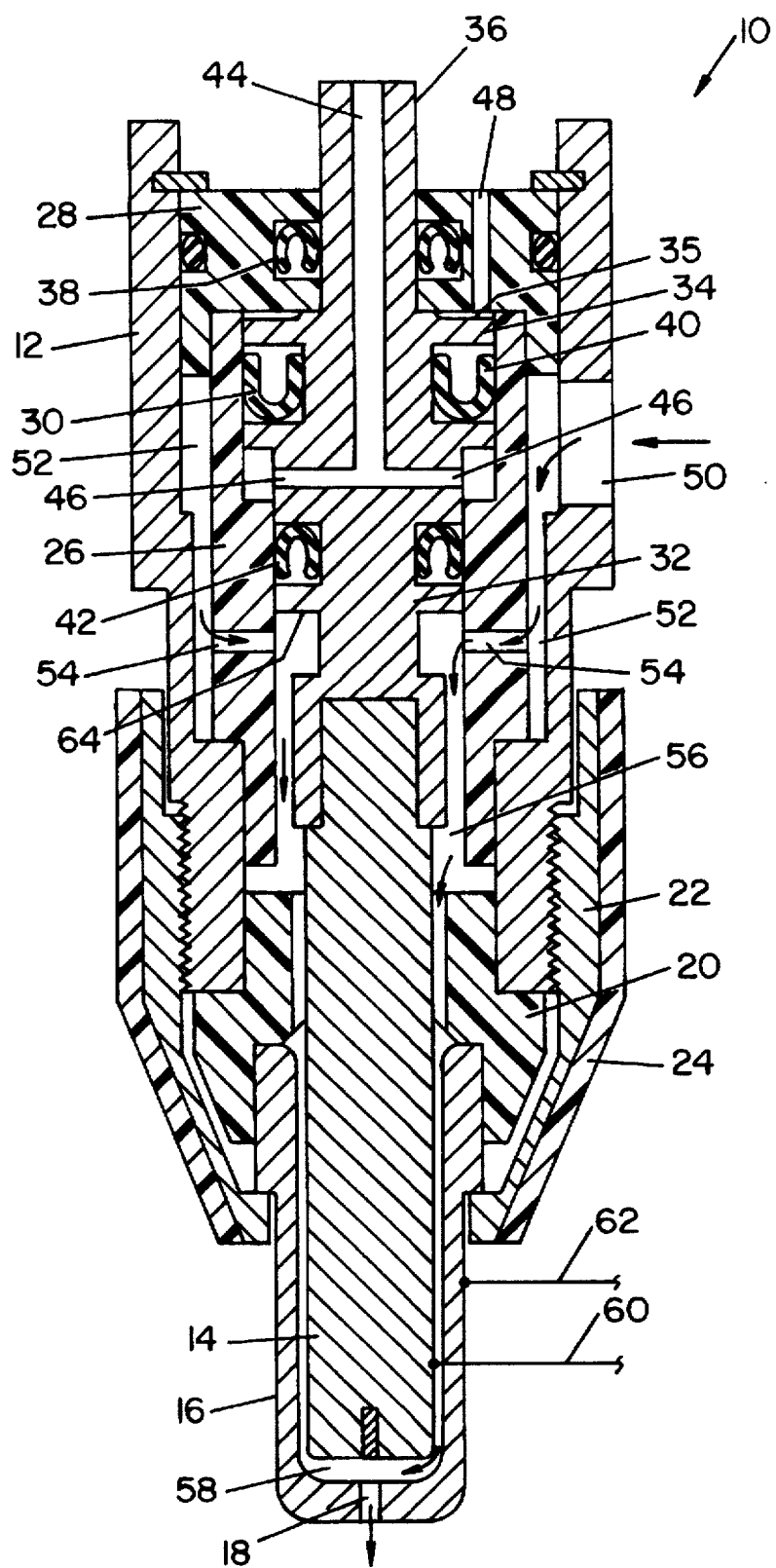
FIG. 1 is a sectional elevation view of a plasma arc torch in accordance with the present invention.

Referring now in greater detail to the drawings wherein the showings are for the purpose of illustrating preferred embodiments of the invention only and not for the purpose of limiting the same, FIG. 1 illustrates a plasma arc torch 10 having a generally cylindrical body portion 12 supporting an electrode 14 and a nozzle 16 having a plasma outlet opening 18. Nozzle 16 is supported on body portion 12 by a swirl ring 20 of insulating material and an internally threaded cap member 22 provided on its outer side with an insulating shield 24. Body portion 12 supports a cylindrical member 26 of insulating material which, together with an upper cap member 28 of insulating material provides a piston chamber 30 which is co-axial with the electrode and nozzle. A piston member 32 is axially slidably supported by cylindrical member 26 and end cap 28 and includes an upper end 34 disposed in chamber 30. The upper end of electrode 14 is secured to the lower end of piston member 32 for displacement with the piston member, and the upper end of the piston member includes stem portion 36 slidably extending through an opening therefor in end cap 28. Annular seal members 38, 40 and 42 are provided about stem 36, upper end 34 and the portion of piston member 32 below chamber 30, respectively, for the purpose which will become apparent hereinafter. Stem 36 is provided with an axial exhaust passageway 44 having laterally extending inner ends 46 opening into chamber 30 beneath upper end 34 of piston member 32, and end cap 28 is provided with an axially extending airflow passageway 48 having an inner end opening into chamber 30 above upper end 34. Passageway 48 is connected to a source of operating air under pressure, not shown, for displacing piston member 32 and thus electrode 14 downwardly relative to nozzle 16 in the manner and for the purpose set forth hereinafter. Body portion 12 is provided with an arc air inlet opening 50 connected to a source of arc air under pressure, not shown. The source of operating air can be separate from the source of arc air or can be tapped therefrom. Body portion 12 and cylindrical member 26 provide an annular arc gas passageway 52, and annular member 26 is provided with radially extending ports 54 connecting passageway 52 with an inner annular passageway 56 surrounding electrode 14 and communicating with pilot arc chamber 58 between the lower ends of electrode 14 and nozzle 16. Electrode 14 and nozzle 16 are adapted to be connected across a source of arc current by leads 60 and 62, respectively, whereby, in a well known manner, when electrode 14 is displaced downwardly from the position shown in FIG. 1 to contact nozzle 16 and is then moved back toward the position shown in FIG. 1 a pilot arc is generated therebetween.

Displacement of electrode 14 downwardly from the position shown in FIG. 1 to contact nozzle 16 is achieved by flowing operating air under pressure into passageway 48 and thus against the upper side 35 of piston member 32 and exhausting the air beneath upper end 34 through passageway 44. Displacement of the electrode from contact with nozzle 16 back to the position shown in FIG. 1 is achieved by flowing arc gas under pressure through passageway 54 and thus against the underside 64 of piston member 32 while allowing for the air introduced through passageway 48 to exhaust through the latter passageway. As will become apparent hereinafter, electrode 14 is displaceable downwardly from the position shown in FIG. 1 to contact nozzle 16 without having to interrupt the flow of arc air through inlet opening 50 and is so displaceable against the force generated in the opposite direction by the arc air acting against the piston member. In this respect, as will be appreciated from FIG. 1, upper side 35 of piston member 32 provides a reaction surface of considerably greater area than that of surface 64 on the underside of the piston member. Thus, assuming for example that the arc air and operating air are at the same given pressure, the force acting in the downward direction in FIG. 1 against piston member 32 is greater than the force acting in the upper direction whereby, in accordance with one aspect of the invention, electrode 14 can be displaced downwardly from the position shown in FIG. 1 to contact nozzle 16 without having to interrupt the supply of arc air through inlet opening 50. This advantageously enables restarting of the torch in the event of an unintentional extinguishing of the arc without having to interrupt the arc current power supply and/or arc air flow as heretofore required. Moreover, such displacement capability advantageously lends to a pre-flow of arc air to the nozzle and through the outlet opening 18 so as to blow any dirt or the like out of the pilot arc chamber, and post-flow of the arc gas following intentional extinction of the arc such as for cooling purposes. At the same time, it will be appreciated that electrode 14 can be displaced in opposite directions relative to nozzle 16 by alternately flowing operating air through one of the passageways 44 and 48 and exhausting operating air through the other and without any flow of arc gas through inlet opening 50, whereby pre-flow and post-flow of arc gas is selective. Further in connection with cleaning, it will be appreciated that electrode 14 can be displaced downwardly to contact nozzle 16 with a predetermined force sufficient to break up any oxide build-up on the electrode and/or nozzle and can be displaced into and out of contact with the nozzle a number of times for this purpose. The force of contact between the electrode and nozzle is of course dependent on the area of the upper surface of piston member 32 and the pressure of operating air acting thereagainst, whereby it will be appreciated that a desired force of engagement between the electrode and nozzle can readily be achieved by varying these parameters.

Further in connection with FIG. 1, it will be appreciated that the electrode and nozzle in a plasma arc torch have an initial position relative to one another which can be the position in which the electrode contacts the nozzle or the position in which the electrode is spaced an operating distance therefrom. The embodiment of FIG. 1 advantageously enables either of the relative positions between the electrode and nozzle to be the initial position. Important too is the fact that all of the components parts by which the foregoing advantages are achieved are co-axial with respect to the electrode and nozzle axes, thus minimizing the space requirements for the component parts.

Figure 2:
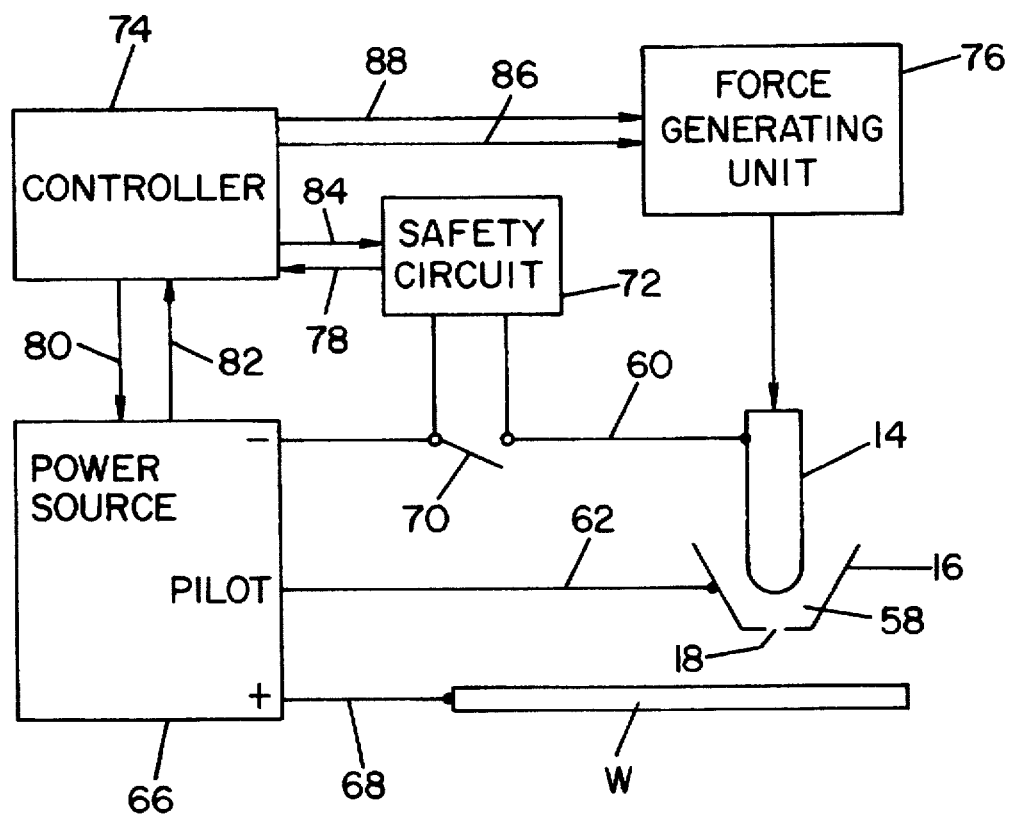
FIG. 2 is a block diagram schematically illustrating a system in accordance with the present invention for testing a plasma arc torch for the presence of a nozzle.

In accordance with another aspect of the present invention, as will be appreciated from the following description of FIG. 2-7 with reference to the electrode and nozzle arrangement of FIG. 1, a safety check system is provided for assuring that nozzle 16 is properly mounted on the torch body relative to electrode 14 before enabling starting of the torch. More particularly in this respect, as shown in FIG. 2, lines 60 and 62 respectively connect electrode 14 and nozzle 16 to power source 66 to enable creating a pilot arc, and a workpiece W is connected to the power source by a line 68 to facilitate transfer of the arc to the workpiece. Line 60 is provided with a safety switch 70 for opening and closing the circuit to electrode 14 and nozzle 16 and for activating a safety circuit 72 such as in response to depression of the torch trigger. A controller 74 includes a micro-processor programmed to respond to sensed test parameters and to control the test procedure as well as enabling or disabling creation of a pilot arc as will be described in greater detail hereinafter. A force generating unit 76 by which electrode 14 is displaced relative to nozzle 16 is adapted to be activated by controller 74 and, in conjunction with the electrode and nozzle arrangement of FIG. 1, force generating unit 76 would be defined by a source of operating air under pressure.

Figure 3:
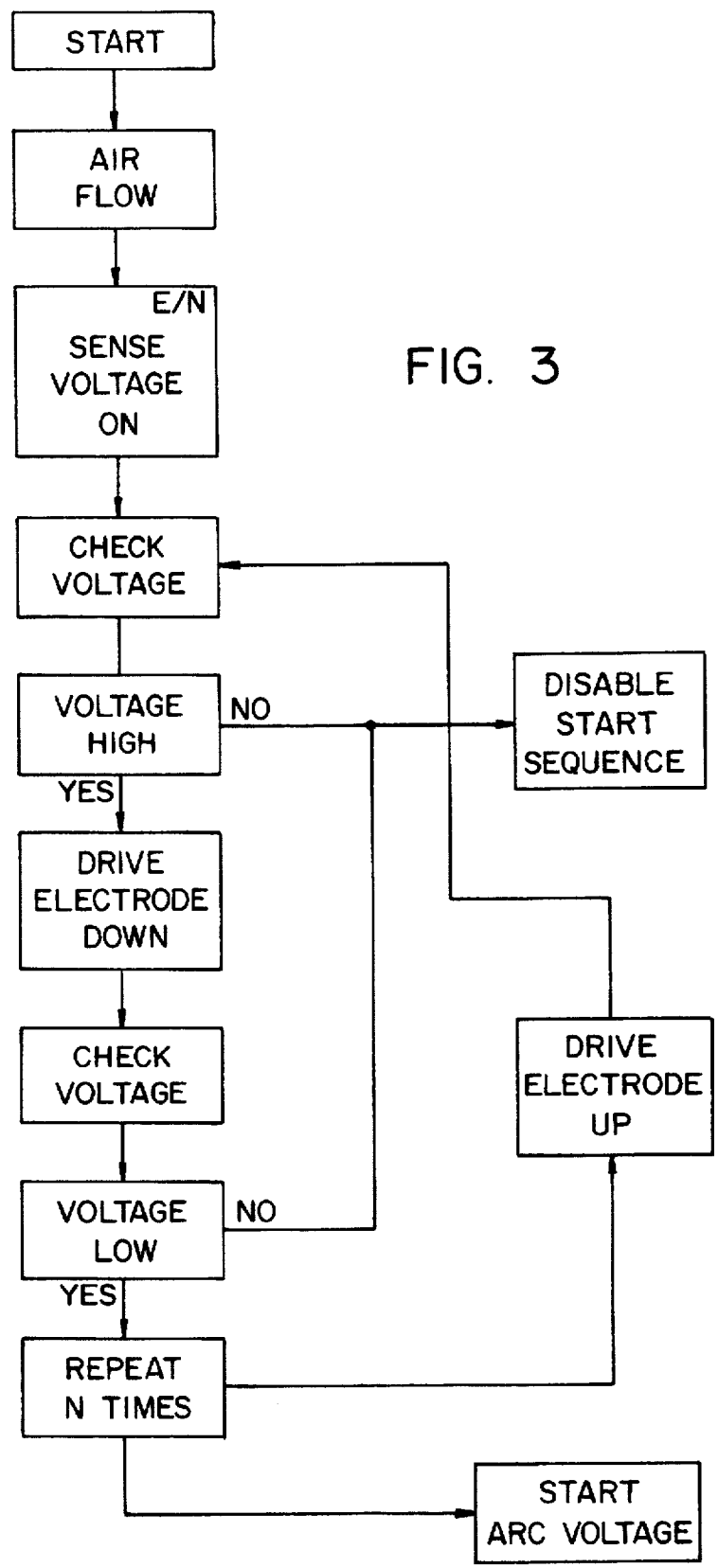
FIG. 3 is a flow chart of the operation of the testing system.
Figure 3A:
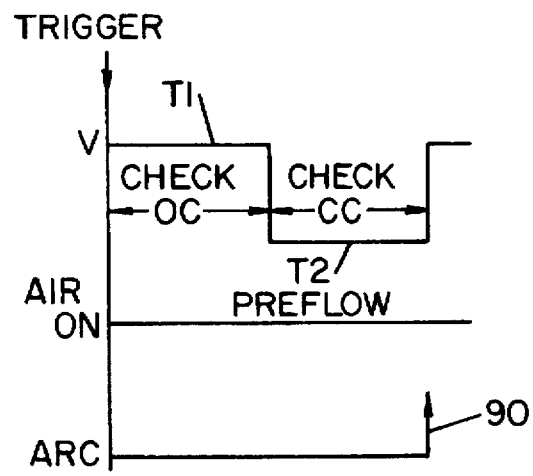
FIGS. 3A–3C are signal, air flow and arc pattern graphs corresponding to different formats of operation of the test system.

A test procedure in accordance with this aspect of the invention is depicted in the flow chart of FIG. 3 and the pattern graph of FIG. 3A. In this procedure, the operator depresses the torch trigger to start the safety check by closing switch 70 to activate safety circuit 72 which then sends a signal through line 78 to activate controller 74. While not shown in FIG. 2, depression of the torch trigger can also initiate flow of arc gas to the arc gas chamber 58, if desired. Controller 74 senses that the test voltage to be applied from power source 66 to the electrode and nozzle is on and, assuming the initial relative position between electrode 14 and nozzle 16 to be the spaced apart position shown in FIG. 2, controller 74 sends a control signal through line 80 to power source 66 and in response to which power source 66 outputs a low voltage test signal through the circuit defined by line 60, electrode 14, nozzle 16 and line 62. The power source then senses the electrode-nozzle circuit condition and sends a corresponding signal through line 82 to controller 74. An open circuit condition produces a high voltage signal, and a closed circuit condition produces a low voltage signal. In the spaced position of electrode 14 relative to nozzle 16, an open circuit condition should be sensed. If an open circuit condition is not sensed such as due to a short between the electrode and nozzle, controller outputs a control signal through line 84 to safety circuit 72 by which the latter opens switch 70, thus precluding further operation of the torch until the fault condition is corrected. If an open circuit condition is sensed, controller 74 outputs a control signal through line 86 to force generating unit 76 by which the latter responds to displace electrode 14 downwardly from the position shown in FIG. 2 into contact with nozzle 16. Power source 66 then senses for a closed circuit condition and transmits a signal corresponding to the sensed circuit condition to controller 74 through line 82. If a closed circuit condition is not sensed, such as when there is a build-up of oxides on the electrode and/or nozzle, controller 74 outputs a control signal through line 84 to safety circuit 72 by which switch 70 opens to preclude further operation of the torch until the fault condition is rectified. If a closed circuit condition is sensed by power source 66, controller 74 outputs a control signal through line 80 to power source 66 enabling an arc starting current to flow in the electrode-nozzle circuit, and the controller outputs a signal through line 88 to force generating unit 76 by which the latter operates to displace electrode 14 to its position spaced an operating distance therefrom, whereby an arc is generated as the electrode moves out of contact with the nozzle as indicated by arrow 90 in FIG. 3A.

Figure 3B:
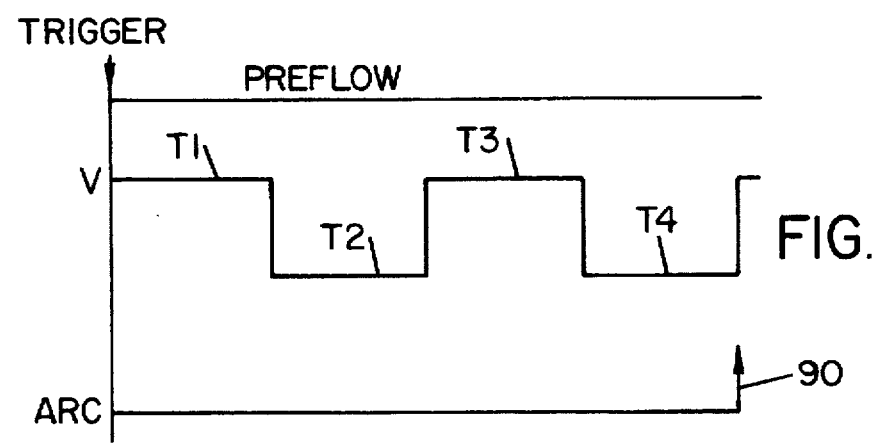

While the safety start sequence described above enables the power source for creating a starting arc upon the sequential sensing of an open circuit condition followed by a closed circuit condition, it will be appreciated as shown in FIG. 3, that the sequence of open and closed circuit condition checks can be repeated any number of times in accordance with the program of the micro-processor in controller 74 prior to enabling the power source to supply an arc voltage to the electrode-nozzle circuit. A preferred starting sequence in this respect with the initial position of the electrode being that in which the electrode is spaced from the nozzle is depicted in FIG. 3B. As will be appreciated from the preceding description, the micro-processor in controller 74 would in this instance be programmed to require the sequential sensing of open, closed, open and closed circuit conditions before enabling starting of the arc following the sensing of the second closed circuit condition.

Figure 3C:
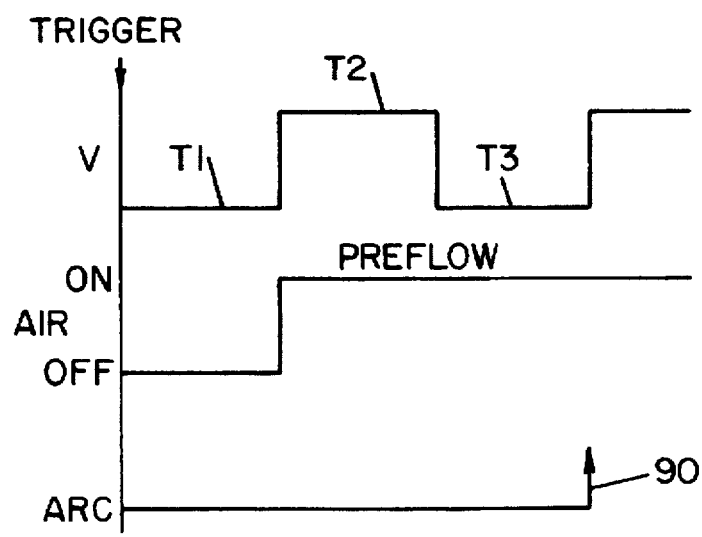

While the foregoing starting sequence safety checks are described in conjunction with the initial position of the electrode being that in which the electrode is spaced from the nozzle, a starting sequence safety check with the electrode contacting the nozzle in the initial position thereof is depicted in FIG. 3C. In this instance, the micro-processor of controller 74 would be programmed to control the starting of an arc in response to the power source sequentially sensing a number of closed and open circuit conditions and, preferably, as shown in FIG. 3C, a sequence of at least closed, open and closed circuit conditions. As mentioned above, and as will be further appreciated from FIG. 3C, the pre-flow of arc gas is optional as is the point at which pre-flow is initiated which, in FIG. 3C, is at the point where the electrode is first displaced from its initial position to its position spaced from the nozzle.

Starting sequence safety checks of the foregoing character advantageously optimize safety for the operator in the event that starting of the torch is attempted when, for example, nozzle 16 is not mounted on the torch, whereby the electrode is exposed, whereby the operator can accidentally short the electrode across a conductive portion of the torch body such as with a tool. A sequential electrode-nozzle circuit condition test according to the invention would be difficult to defeat in requiring a specific sequential condition which would have to be matched by the operator's actions in shorting the electrode. Further in accordance with this aspect of the invention, protection against such duplicating is optimized by providing for each of the open and closed circuit conditions to have a pre-determined time of duration as indicated by times T1, T2, T3 and T4 in FIGS. 3A–3C, and which time duration may, for example, be about 200 milliseconds or less.

Figure 7:
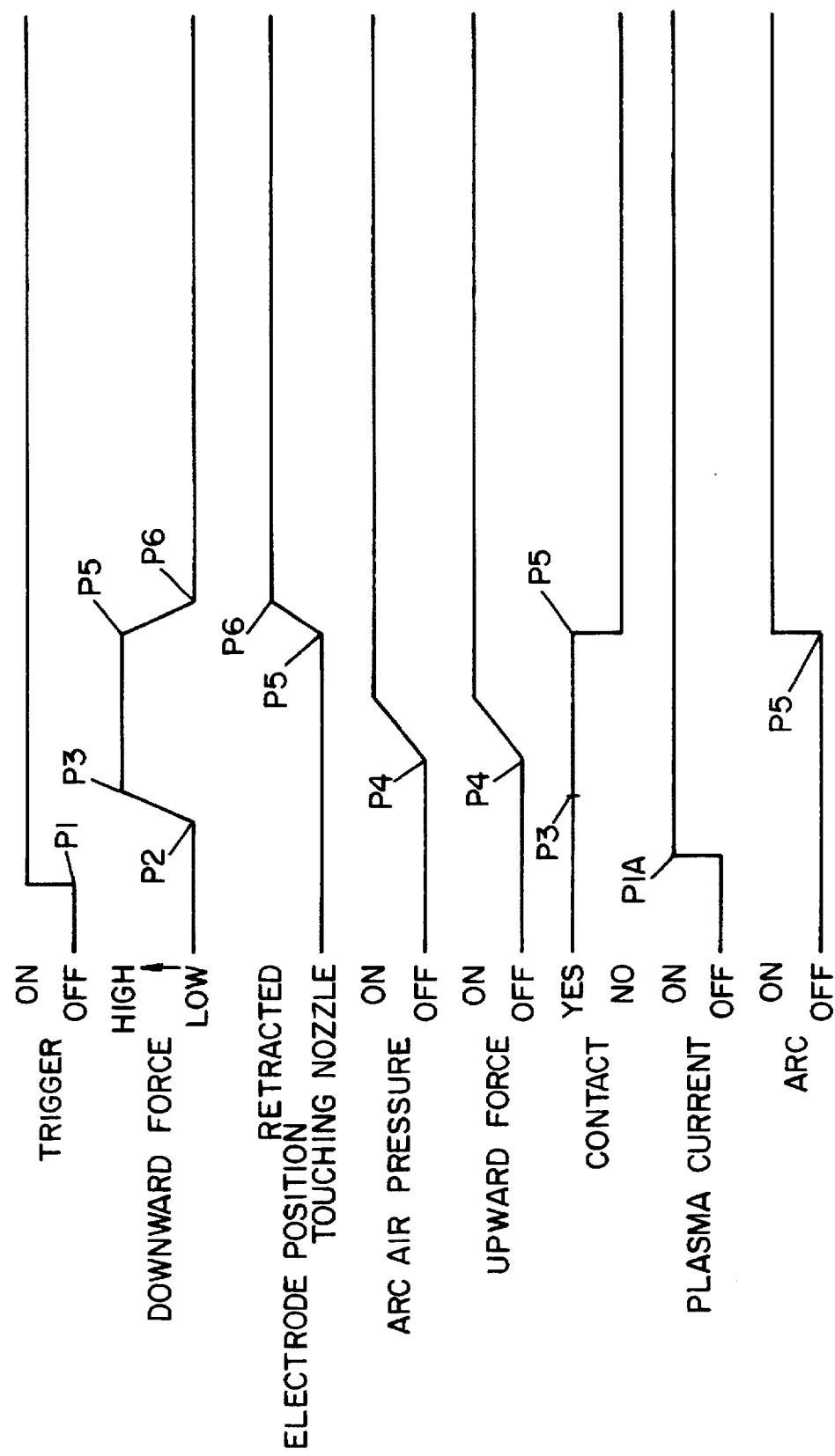

FIGS. 4–7 schematically illustrate patterns of displacement of various parts of the torch during test starting sequences having different test formats. FIGS. 4–6 depict such patterns in connection with test formats similar to those depicted in FIGS. 3B, 3C and 3A, respectively, and FIG. 7 illustrates such patterns in connection with yet another test format. While these figures will be discussed with reference to the nozzle-electrode arrangement illustrated in FIG. 1 and the use of operating air under pressure as the medium for providing upward and downward force for displacing the electrode relative to the nozzle, it will become apparent hereinafter that other electrode-nozzle arrangements in accordance with the invention provide various combinations of air, springs and the like for providing the upward and downward forces.

Referring now to FIG. 4, which as mentioned above, corresponds substantially to the starting sequence described above with respect to FIG. 3B, and considering the retracted position of electrode 14 in FIG. 1 to be the initial position in which the electrode is held by the frictional engagement between seals 38, 40 and 42 and piston member 32, the pattern of the starting sequence is as follows. The torch trigger is initially off and there is no airflow through either passageway 44 or 48 from the operating air source, whereby the downward force against piston head 34 is low and the upward force thereagainst is off. Electrode 14 is retracted relative to nozzle 16, the arc air pressure is off, although it could be on as described here-in-above with regard to FIG. 3B. There is no contact between electrode 14 and nozzle 16, and the plasma current is off as is the starting arc. At point P1, the torch trigger is turned on to activate safety circuit 72 and thus controller 74 of the test system, whereupon the open circuit condition between the electrode and nozzle would be sensed as explained above. At point P2, following the sensing of the open circuit condition, controller 74 issues a control signal through line 86 by which force generating unit 76 is operable to initiate flow of operating air through passageway 48 against the upper side of piston head 34, whereby the downward force goes high and electrode 14 is displaced downwardly to contact nozzle 16 at point P3. At point P3, the closed circuit condition is sensed and controller 74 is operable in response thereto to activate the upward force output from force generating unit 76 for operating air under pressure to flow through passageway 44 to the underside of piston head 34, whereby the upward force is turned on and, at point P4, controller 74 is also operable to turn on the arc air pressure, whereupon a pre-flow of the arc air enters the torch through inlet opening 50. As explained above with regard to FIG. 1, the operating force acting downwardly on piston head 34 is greater than that acting upwardly against the underside of the piston head, whereby at point P4 the electrode remains in contact with the nozzle. At point P5, following the sensing of the closed circuit condition, force generating unit 76 receives a control signal from controller 74 through line 88, whereupon the force generating unit is operable to interrupt the flow of operating air under pressure through passageway 48 so as to depressurize the upper side of piston chamber 30, whereupon the downward force against piston head 34 goes low, electrode 14 moves back to its retracted position at point P6 and the electrode-nozzle are again in the open circuit condition. It will be noted at this point that the arc air pressure and the upward force against the underside of piston head 34 are maintained on constantly from point P4. At point P5 when electrode 14 moves out of contact with nozzle 16, an open circuit condition exists and is sensed as described hereinabove and, at point P7 force generating unit 76 is operable in response to a control signal from controller 74 to flow control air under pressure through passageway 48 against the upper side of piston head 34, whereby the downward force again goes high to displace electrode 14 downwardly to contact nozzle 16 at point P8, whereupon sensing of the closed circuit condition resulting therefrom commences. Assuming that the system has sensed the appropriate sequence of open, closed, open and closed circuit conditions at this time, the plasma current is turned on at point P9 and, at point P10, force generating unit 76 is operable in response to a control signal from controller 74 to once again exhaust the upper end of chamber 30 whereupon the downward force goes low and the upward force operates to displace electrode 14 to its retracted position. In conjunction with the latter displacement of electrode 14, a pilot arc is initiated at point P10 as electrode 14 moves out of contact with nozzle 16.

As mentioned above, FIG. 5 depicts a start up test sequence corresponding substantially to that described hereinabove with regard to FIG. 3C, whereby it is believed that the function patterns depicted in FIG. 5 will be understood from the description of FIG. 3C and the foregoing description of FIG. 4 without a step-by-step description of FIG. 5. It only needs to be noted that in FIG. 5 the initial position of the electrode is the position in which the electrode contacts the nozzle. Thus, with the electrode-nozzle arrangement illustrated in FIG. 1, electrode 14 would initially contact nozzle 16 and would be held in the latter position by the frictional engagement between the seals and piston member. Further, at point P2 in FIG. 5, force generating unit 76 operates in response to a control signal from controller 74 to cause the flow of air through passageway 48 against the upper side of piston head 34, whereby the downward or closing force goes high to assure good electrical contact for the sensing of the initial closed circuit condition which takes place between points P3 and P5.

As also mentioned above, FIG. 6 corresponds substantially to the start-up test sequence described here-in-above with regard to FIG. 3A wherein the initial position of the electrode is the position shown in FIG. 1 in which the electrode is spaced an operating distance from the nozzle. Thus, with the exception of the patterns for the plasma current and arc, the patterns in FIG. 6 correspond to those discussed here-in- above with regard to FIG. 4, the difference being that starting of the pilot arc in FIG. 6 is enabled upon the sequential sensing of one open circuit condition followed by one closed circuit condition, namely at point P5. Accordingly, the plasma arc current in FIG. 6 is turned on at point P3A following detection of a closed circuit at point P3, and the arc is initiated at point P5 rather than at point P10 as in FIG. 4.

The starting sequence patterns depicted in FIG. 7 are similar to those depicted in FIG. 5 with the exception of the plasma current and arc patterns. The patterns depicted in FIG. 7 correspond to a torch such as that in FIG. 1 in which the initial position of the electrode is that position in which the electrode contacts the nozzle whereby, as in FIG. 5, the initial electrode-nozzle circuit condition is closed. In FIG. 7, the pilot arc is enabled if a closed circuit condition is sensed with the electrode contacting the nozzle in the initial position of the electrode and, therefore, the plasma arc current is turned on at point P1A to enable the arc to be generated at point P5 when the electrode is displaced out of engagement with the nozzle.

With further regard to the patterns depicted in FIGS. 4–7, it will be appreciated that the exact time of starting the flow of arc gas is not critical, provided that the flow commences some time between when the torch trigger is pulled and the electrode is retracted from contact with the nozzle at the point in the sequence at which generation of the pilot arc is to take place.

With further regard to FIGS. 4–7, and in accordance with another aspect of the invention, it will be appreciated that cleaning of the area of contact between the electrode and nozzle in accordance with the invention advantageously takes place during the described start up safety tests. More particularly in this respect, each time the electrode contacts the nozzle, the high downward force operates to break down oxide build up on the electrode and/or nozzle. Moreover, as described here-in-above and as will become more apparent hereinafter, the downward force applied to the electrode can be several times greater than the force available in accordance with prior art arrangements, thus optimizing the cleaning capability. As will be appreciated from those safety tests wherein the electrode is displaced into and out of engagement with the nozzle more than once, each such displacement enhances the cleaning operation. As will be further appreciated from the description thus far, the ability to selectively provide for the pre-flow of arc gas during the test procedures further enhances the cleaning operation by blowing broken up oxide particles from the pilot arc chamber. At the same time, it will be appreciated that cleaning of the area of contact between the electrode and nozzle can be achieved by relatively displacing the electrode and nozzle into and out of contact with the application of a force of engagement therebetween to promote cleaning but independent of the testing procedure. In this respect, for example, the electrode could be displaced into and out of engagement with the nozzle a number of times before initiating a test procedure, thus to assure good electrical contact between the electrode and nozzle during a subsequent testing operation. Still further in connection with testing and cleaning operations, if the start sequence is disabled during testing because a closed circuit condition is not sensed with the electrode positioned to contact the nozzle, with the nozzle properly mounted on the torch body, a cleaning operation can be performed by displacing the electrode into and out of contact with the nozzle a number of times prior to initiating a subsequent starting sequence safety check. All of these capabilities advantageously enhance minimizing the cycle time between sequential starts of a torch and maintenance time otherwise required to disassemble, clean and reassemble the nozzle and electrode components.

Figure 8:
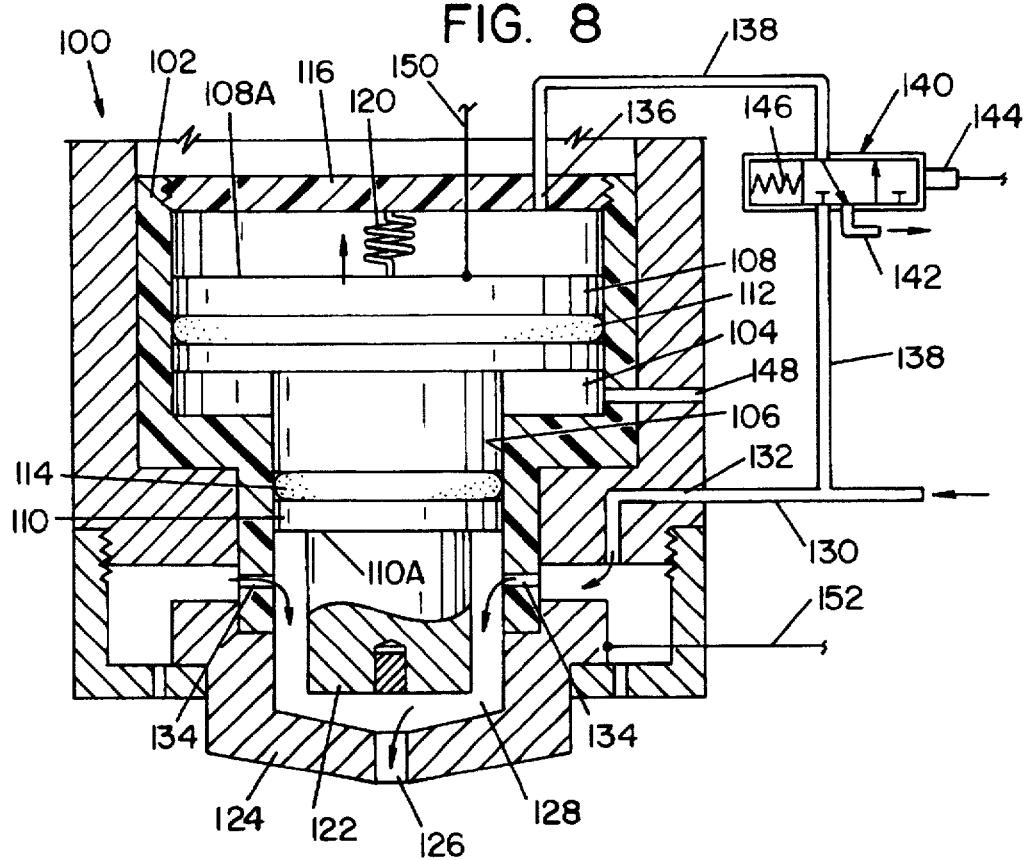
FIG. 8 is a sectional elevation view somewhat schematically illustrating another arrangement for relatively displacing the electrode and nozzle components of a plasma arc torch in accordance with the present invention.

Another electrode and nozzle arrangement by which the foregoing advantages and operating capabilities are achieved is illustrated in FIG. 8 of the drawing. In this embodiment, torch body 100 supports an annular member 102 of insulating material which provides a piston chamber having an upper portion 104 and a lower portion 106 of reduced diameter relative to portion 104. The piston chamber reciprocally supports a piston member having a piston head 108 in chamber portion 104 and a stem 110 in chamber portion 106. Piston head 108 and stem 110 carry sealing rings 112 and 114, respectively, by which the piston member is sealed relative to the piston chamber. The upper end of chamber portion 104 is closed by an end wall 116, and the piston member is normally biased to the position shown in FIG. 8 by a tension spring 120 between the upper end of piston head 108 and wall 116. An electrode 122 is mounted on the lower end of stem 110 for reciprocating displacement with the piston member, and body portion 100 of the torch removeably supports a nozzle member 124 having a plasma outlet opening 126 therethrough. Arc air is adapted to be supplied to pilot arc chamber 128 from a suitable source of air under pressure, not shown, through a line 130, a passageway 132 provided in body portion 100 and radial ports 134 provided in the lower end of cylindrical member 102. Operating air under pressure is adapted to be selectively introduced into upper chamber portion 104 above piston member 108 through a passageway 136 in end wall 116 and a supply line 138 connected to arc air supply line 130 and having an operating air control valve 140 interposed therein. Valve 140 has a deactivated position as shown in FIG. 8 in which the portion of chamber 104 above piston head 108 is vented to atmosphere through a line 142, and an activated position in which the valve slide is displaced to the left in FIG. 8 so as to connect line 138 thereacross and to block the flow to atmosphere through line 142. Valve 140 can be pneumatically displaced from its deactivated position to its activated position and includes an operating portion 144 for this purpose, and the valve is biased to its deactivated position by a spring 146. Chamber portion 104 beneath piston head 108 is vented to atmosphere by means of a port 148. The electrode and nozzle are adapted to be connected to a source of arc current as schematically illustrated by lines 150 and 152, respectively.

As will be appreciated from FIG. 8 and the above description, the initial position of electrode 122 relative to nozzle 124 is the position in which the electrode is spaced an operating distance from the nozzle and which position is provided by the bias of tension spring 120. The operating force for displacing electrode 122 downwardly to contact nozzle 124 is provided by air under pressure flowing through line 138 across valve 140 and inlet passage 136 against the upper side of piston head 108. More particularly in this respect, when arc air is being supplied to pilot arc chamber 128 through supply line 130, valve 140 can be selectively displaced to the left in FIG. 8 such that a portion of the arc air flows through line 138 to inlet passageway 136 and the upper end of chamber portion 104 so as to act against the piston head 108. As will be appreciated from FIG. 8, the reaction surface of piston head 108 as defined by upper surface 108A thereof has an area considerably larger than that of the underside 110A of stem 110 against which arc gas entering through passageway 134 may react, whereby the piston member and thus electrode 122 are rapidly displaced downwardly for the electrode to impact against nozzle 124 and to apply a closing force thereagainst several times greater than the return force provided by spring 120 and reaction of the arc air against surface 110A. Thus, with a relatively low arc gas pressure, a considerably high closing force can be applied with the arrangement shown in FIG. 8. Moreover, while this arrangement advantageously provides for obtaining such a high closing force using the pressure of the arc air supply for achieving the desired result, it will be appreciated that the operating fluid for displacing the piston head and thus electrode 122 into contact with nozzle 124 could be provided from a source other than the arc air supply. In any event, it will be appreciated that valve 140 can be sequentially cycled between the positions thereof to sequentially displace electrode 122 into contact with and away from contact with nozzle 124 either for cleaning and/or in connection with start sequence testing as described hereinabove. Advantageously, the arc gas supplied to the electrode/nozzle area through supply line 130 is not relied upon to bias electrode 122 into either of its operating positions, and any bias of the electrode in the direction to move the electrode away from the nozzle is easily overridden by the closing force provided by the arc gas acting against piston surface 108A. The latter advantageously enables restarting the torch in the event of an unintentional extinction of the arc during operation of the torch. In this respect, following such extinction and without having to interrupt the flow of arc current in the electrode/nozzle circuit, valve 140 can be displaced to the left in FIG. 8 for arc air to flow through line 138 into the upper end of chamber 104 to displace piston head 108 and thus electrode 122 downwardly for the electrode to contact nozzle 124, after which valve 140 is released for return to the position shown in FIG. 8, whereupon electrode 122 moves out of contact with nozzle 124 such that the pilot arc is generated to restart the torch.

Figure 9:
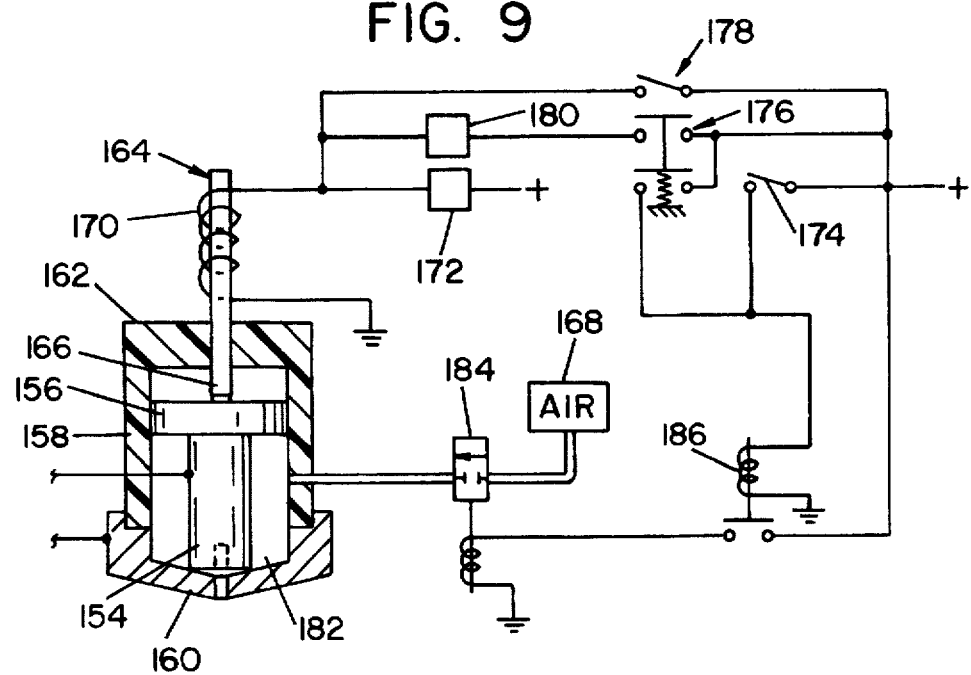
FIG. 9 is a sectional elevation view schematically illustrating still another arrangement for relatively displacing the electrode and nozzle components of a plasma arc torch in accordance with the invention.

FIG. 9 illustrates yet another electrode and nozzle arrangement in accordance with the present invention. In this embodiment, electrode 154 is attached to the underside of a piston 156 reciprocally supported by a cylindrical member 158 of insulating material to which a nozzle 160 is attached. The upper end wall 162 of member 158 is apertured to slidably receive a force applying member 164 having a lower end 166 which is not attached to piston 156 and accordingly is adapted to be displaced relative thereto. Basically, piston 156 and electrode 154 float relative to member 158 and nozzle 160 in that the piston and electrode are not initially biased other than by the negligible weight of force applying member 164. In this embodiment, the initial position of electrode 154 is the position in which the electrode contacts nozzle 160 as shown in FIG. 9, and the electrode is adapted to be displaced from its initial position to a position in which the electrode is spaced an operating distance from nozzle 160 by arc air under pressure from a source 168 thereof. Further, as will become apparent hereinafter, force supplying member 164 is adapted to be displaced downwardly against the upper side of piston 156 by a coil 170 extending thereabout and adapted to be electrically energized and de-energized through control circuitry including a device 172 operable in conjunction with a start sequence testing system such as that described above with regard to FIG. 2. In such test system device 172 would be responsive to control signals from controller 74 to sequentially energize and de-energize coil 170 in conjunction with open and closed circuit testing of the electrode-nozzle positional relationship. The control circuitry further includes a trigger switch 174, a double pole switch 176 and a single pole switch 178, the operations of which are described hereinafter, and a time delay relay device 180 in series with one pole of switch 176. The flow of arc air from source 168 to pilot arc chamber 182 is controlled by a solenoid actuated valve 184, which is normally closed as shown in FIG. 9, and the solenoid coil of valve 184 is adapted to be energized and de-energized through a solenoid or relay switch 186 which is selectively controlled as set forth hereinafter by trigger switch 174 and double pole switch 176.

In operation of the embodiment shown in FIG. 9, with regard first to performing a start up safety test, trigger switch 174 is closed which, as will be appreciated from the foregoing description of FIG. 2, activates the safety circuit and controller, whereby device 172 would respond to a control signal from the controller to energize coil 170 and apply a downward force on drive member 164 during the sensing of a closed circuit condition in the initial position of the electrode. The closure of trigger switch 174 also energizes the coil of switch 186 to close the latter, whereby the coil of valve 184 is energized to displace the valve to its open position whereupon arc air under pressure flows from source 168 to pilot arc chamber 182. Following the closed circuit condition check, device 172 is operable to de-energize coil 170 whereupon arc gas under pressure in chamber 182 acts against the underside of piston 156 to elevate the latter and thus electrode 154 to the operating position thereof relative to nozzle 160. Following the open circuit check in the latter position, device 172 is again operated to energize coil 170 whereby drive member 164 displaces the piston and electrode downwardly for the electrode to contact nozzle 160, such displacement being against the bias of arc gas against the underside of piston 156. Moreover, it will be appreciated that the magnitude of the downward force which can be applied depends on the coil design, and that the downward force can be quickly applied so as to impact electrode 154 against nozzle 160 to optimize the break up of any oxide therebetween. It will be further appreciated that the electrode can be sequentially displaced in the foregoing manner between the open and closed positions thereof relative to nozzle 160 any number of times, concluding with generating of a pilot arc in response to the final displacement of the electrode out of contact with the nozzle. Should the arc be unintentionally extinguished during operation of the torch, switch 178 can be closed independent of interruption of the arc current or the supply of arc gas to energize coil 170 for drive member 164 to displace the electrode downwardly to its position contacting nozzle 160, whereupon the torch is restarted when switch 178 is opened and the electrode is moved out of contact with the nozzle by the arc gas acting against the underside of piston 156.

Switch 176 and time delay device 180 are operable to achieve a cleaning operation with respect to the electrode and nozzle independent of the operation of the torch to achieve a starting sequence safety check. Since cleaning of the electrode-nozzle area can be achieved in conjunction with such a safety check, it will be appreciated that the circuit including switch 176 and time delay device 180 is optional. In order to perform a cleaning operation with the latter circuit, switch 176 is adapted to be closed independent of trigger switch 174 to close switch 186 and thus open valve 184 for the flow of arc air to the pilot arc chamber, and to close a circuit to time delay device 180 which is in series with solenoid coil 170 of the force applying arrangement. In the closed position of switch 176, time delay device 180 is operable to intermittently energize and de-energize coil 170 so as to achieve the rapid displacement of electrode 154 into and out of contact with nozzle 160. It will be appreciated that the time delay device can be designed to achieve a considerable number of displacements in a relatively short period of time thus to in effect repeatedly bounce the electrode against the nozzle to promote cleaning of oxides from therebetween.

Figure 10:
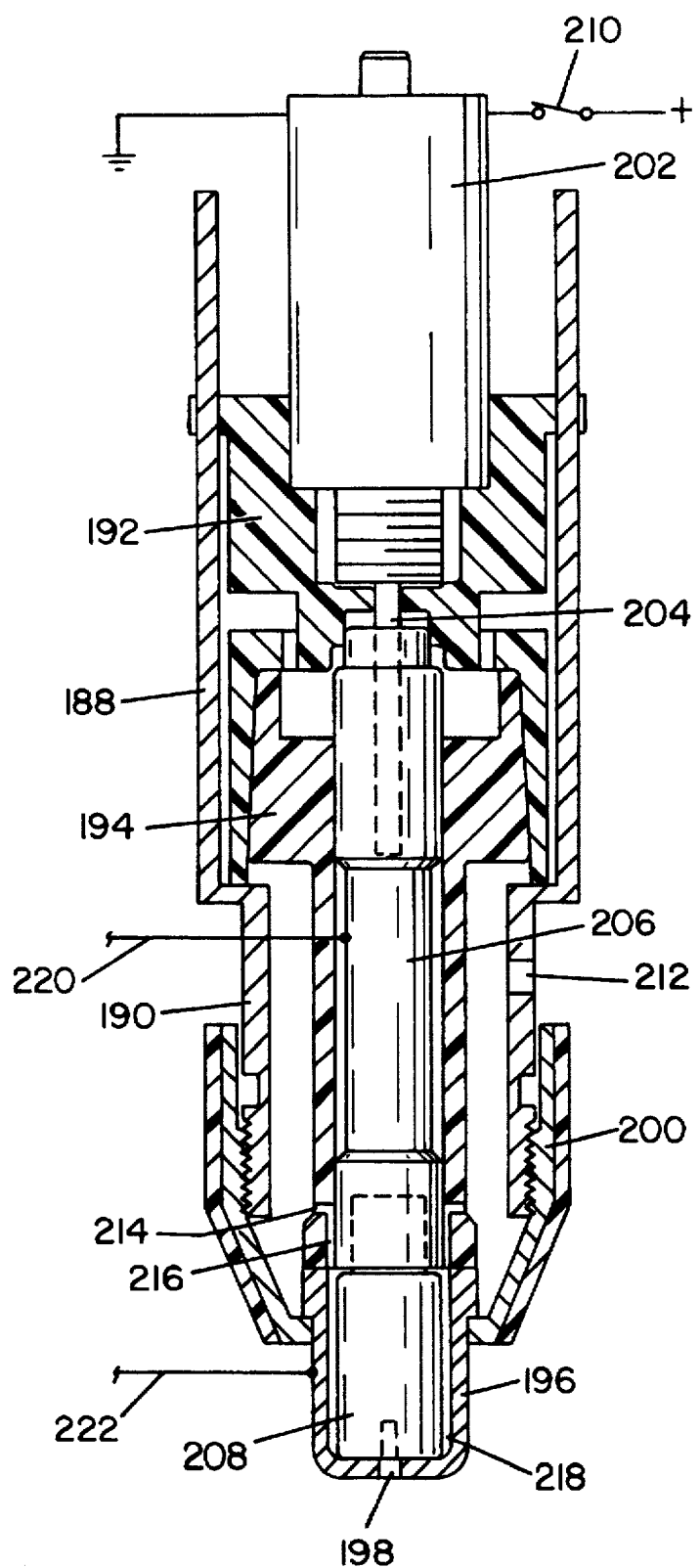
FIG. 10 is a sectional elevation view illustrating still another arrangement for relatively displacing the electrode and nozzle components of a plasma arc torch in accordance with the present invention.

FIG. 10 illustrates a plasma arc torch in accordance with the invention wherein relative displacement between the torch electrode and nozzle is achieved by operation of a solenoid drive unit. More particularly in this respect, a torch body component comprising a cylindrical upper portion 188 and a necked in cylindrical lower portion 190 supports a solenoid mounting and electrode guide assembly comprising a solenoid mounting member 192 and an electrode guide member 194. The lower end of member 192 rests on the annular shoulder between upper and lower body member portions 188 and 190, and the upper end of electrode guide member 194 fictionally and wedgedly interengages with the lower end of the solenoid mounting member. The lower end of electrode guide member 194 extends slightly below the lower end of portion 190 of the torch body, and a nozzle member 196 having a plasma outlet opening 198 therein is removeably mounted on body portion 190 by a mounting sleeve 200 which clampingly engages the upper end of the nozzle against the lower end of the nozzle guide member.

A solenoid unit 202 is supported in the torch body by the upper end of solenoid mounting member 192 and co-axial with the torch nozzle. Solenoid unit 202 includes a downwardly extending plunger 204 which is axially displaceable downwardly relative to the solenoid unit upon energization of the solenoid coil and, upon de-energization of the coil, is displaceable upwardly of the solenoid unit such as by an internal biasing spring, not shown. An electrode holder 206 has its upper end attached to plunger 204 for displacement therewith and is provided at its lower end with an electrode 208 suitably mounted thereon for displacement therewith. Solenoid unit 202 is adapted to be connected across a suitable source of electrode power through a switch 210 having open and closed positions respectively energizing and de-energizing the solenoid coil. Lower portion 190 of the torch body member is provided with an inlet opening 212 adapted to be connected to a source of arc air under pressure, not shown, and the lower end of electrode guide 194 is provided with radial ports 214 opening into an axially extending peripheral passageway 216 by which arc air flowing through inlet 112 flows to pilot arc chamber 218.

In this embodiment, the initial position of electrode 208 is the position in which the electrode is spaced an operating distance from nozzle 196 and, as will be appreciated from the foregoing description, electrode 208 is biased to the latter position by the spring in solenoid unit 202. It will likewise be appreciated that switch 210 is moved from the open position to the closed position thereof shown in FIG. 10 to energize the solenoid coil and displace plunger 204 and thus electrode 208 downwardly for the latter to contact nozzle 196. Moreover, it will be appreciated that the downward force of engagement of electrode 208 with nozzle 196 is a predetermined force which can be of considerable magnitude depending on the design parameters of solenoid unit 202 as can be the speed with which the electrode is displaced into contact with nozzle 196 to obtain an impacting force thereagainst, both of which impacting and force of engagement promote the breakup of oxide in the area of engagement between the electrode and nozzle. In connection with generating a pilot arc between the electrode and nozzle, the latter components are adapted to be connected to an arc current source by leads 220 and 222, and it will be appreciated from the foregoing description that electrode 208 is displaceable between the two positions thereof relative to nozzle 196 without having to interrupt either the arc current power supply or the flow of arc gas to the torch. Accordingly, as will be understood from the foregoing description, should the arc be accidentally extinguished during operation of the torch, switch 210 can be closed to energize solenoid unit 202 to displace electrode 208 downwardly to contact nozzle 196. Thereafter, switch 210 is opened and a pilot arc is generated and the torch restarted as electrode 208 is moved upwardly from contact with nozzle 196 to its operative position relative thereto. Still further, as will be appreciated from the description of earlier embodiments herein, the torch depicted in FIG. 10 can be operated in conjunction with a start up testing system such as that illustrated in FIG. 2, and the area of contact between the electrode and nozzle can be cleaned either in conjunction with or through operation of the component parts independent of a start up safety check.

Figure 11:
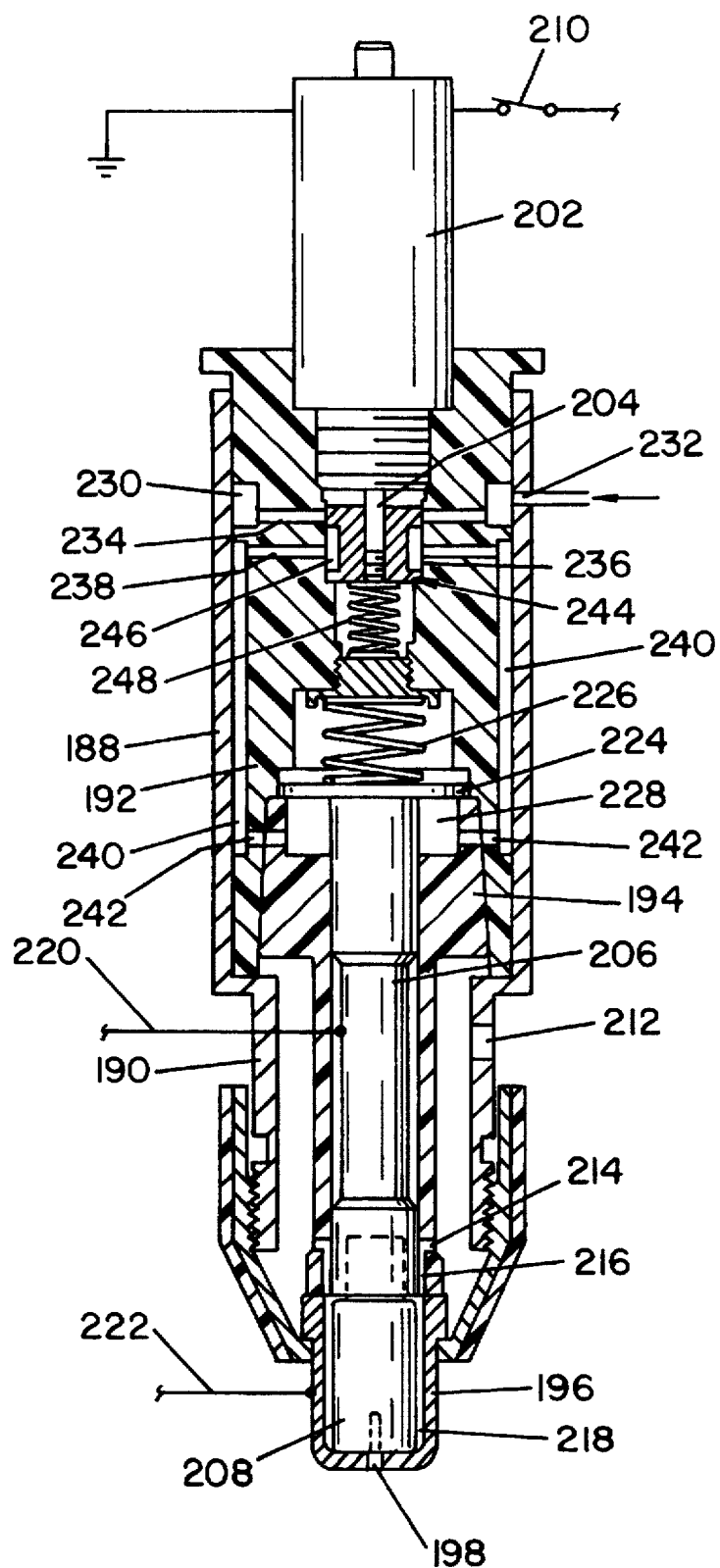
FIG. 11 is a sectional elevation view of a further arrangement for relatively displacing the electrode and nozzle components of a plasma arc torch in accordance with the invention.

Referring now to FIG. 11, there is illustrated a torch structurally similar in many respects to the torch shown in FIG. 10, whereby corresponding parts are designated in FIG. 11 by the same numerals appearing in FIG. 10. In this embodiment, the initial position of electrode 208 is the position in which the electrode contacts nozzle 196 as shown in FIG. 11. The upper end of electrode holder 206 is modified to provide the latter end with a piston member 224, and a compression spring 226 is interposed between solenoid mounting member 192 and piston 224 to exert a downward force on the electrode holder by which electrode 208 is biased to contact nozzle 196 with a force of predetermined magnitude corresponding to the force of spring 226. Further in accordance with this embodiment, electrode holder 206 and thus electrode 208 are adapted to be displaced upwardly from the position shown in FIG. 11 to a position in which the electrode is spaced in operating distance from nozzle 196 by air under pressure acting against the underside of piston member 224 in a chamber 228 therebeneath. Operating air for so displacing piston member 224 is adapted to be introduced into an annular chamber 230 provided in the upper end of solenoid mounting member 192, and upper portion 188 of the torch body is provided with an inlet opening 232 for connecting chamber 230 with a source of operating air under pressure, not shown. For the purpose which will become apparent hereinafter, solenoid mounting member 192 is provided with radial ports 234 communicating chamber 230 with a valve chamber 236 and with radial ports 238 communicating valve chamber 236 with axially extending passageways 240 leading to radial ports 242 opening into piston chamber 228. The flow of operating air entering chamber 230 from inlet 232 is controlled by a valve member 244 mounted on solenoid stem 204 for displacement therewith and having an axially extending circumferential recess 246 in the outer surface thereof.

Valve member 244 is adapted to be displaced by stem 204 to the position shown in FIG. 11 when switch 210 is closed to energize the solenoid coil, and in this position the upper end of valve member 244 closes the radially inner ends of ports 234. When switch 210 is opened to de-energize the solenoid coil, a compression spring 248 biases valve member 244 upwardly from the position shown in FIG. 11 to a position in which recess 246 provides communication between radial ports 234 and 238 and in which position operating air under pressure can flow through inlet passageway 232 and to chamber 228 beneath piston member 224, whereupon the latter is displaced upwardly to move electrode 208 out of engagement with nozzle 196. Thus, it will be appreciated that solenoid unit 202 is de-energized during operation of the torch and during which operation the operating air under pressure maintains piston 224 and thus electrode 208 in the operative position of the electrode. Because of the relatively large surface area on the underside of piston 224, the force of spring 226 can be considerably greater than heretofore possible in arrangements where a spring is relied upon to provide the force of engagement between the electrode and nozzle. Thus, the cleaning of the electrode-nozzle area and good electrical contact are achieved.

The source of operating air connected to inlet 232 can be separate from the arc air supplied through inlet opening 212 for flow to the pilot arc chamber or can be a take off from the arc air supply. In any event, it will be appreciated that electrode 208 can be sequentially displaced between its initial and operative positions relative to nozzle 196 by sequentially displacing member 244 between its two positions for allowing and blocking the flow of operating air to piston chamber 228. Furthermore, it will be appreciated that such sequential displacement of the electrode between its positions can be achieved without interrupting the flow of arc gas to the torch and without interrupting the flow of arc current whereby, in the event of an unintentional extinction of the arc during use of the torch, switch 210 can be closed to energize the coil of solenoid unit 202 to displace valve member 244 to the position shown in FIG. 11 blocking the flow of air to piston chamber 228 whereupon spring 226 biases electrode 208 downwardly to contact nozzle 196. The subsequent opening of switch 210 to de-energize the coil of unit 202 results in displacement of valve member 244 upwardly from the position shown in FIG. 11 to communicate the supply of operating air with piston chamber 228, thus to displace electrode 208 from contact with nozzle 196 enabling a pilot arc and thus restarting of the torch to take place during such upward displacement. As will be further appreciated from the foregoing description, sequential displacement of electrode 208 between its initial and operative positions relative to nozzle 196 is operable to provide cleaning of the area of contact between the nozzle and electrode and provides for the electrode and nozzle arrangement to be operated in conjunction with a start up testing system as described herein to assure against starting of the torch until it is safe to do so.

Figure 12:
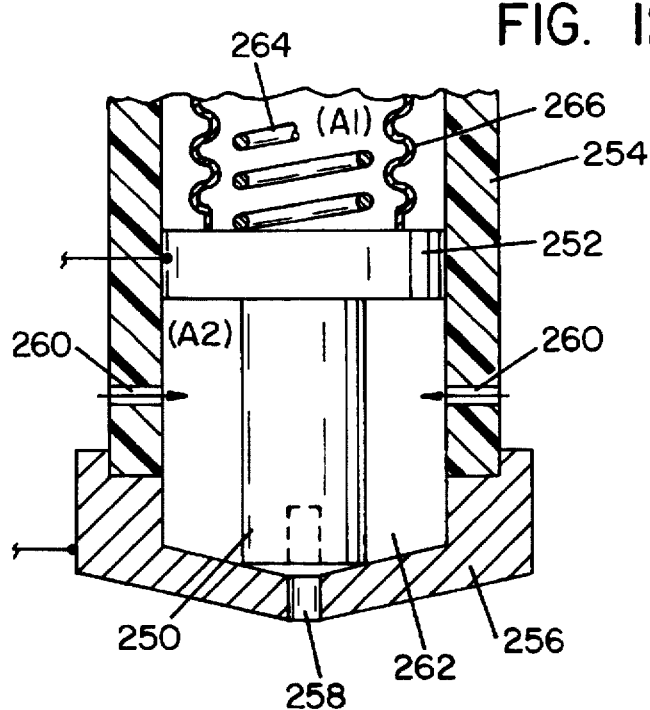
FIG. 12 is a sectional elevation view schematically illustrating yet a further arrangement for relatively displacing the electrode and nozzle components of a plasma arc torch in accordance with the invention.

Another electrode-nozzle arrangement in accordance with the present invention is illustrated in FIG. 12 wherein the electrode 250 is attached to the underside of a piston member 252 which is vertically displaceable in a cylindrical support component 254 of the torch body. A nozzle 256 having a plasma outlet opening 258 is mounted on the lower end of component 254, and the latter is provided with radial inlet openings 260 for the supply of arc air to pilot arc chamber 262 from a suitable source of arc air under pressure, not shown. The initial position of electrode 250 is the position in which the electrode contacts nozzle 256 as shown in FIG. 12, and the electrode is biased to the initial position by the force $F_s$ of a spring 264 acting against the upper side of piston member 252. Electrode 250 is adapted to be displaced upwardly from its initial position to a position in which the electrode is spaced an operating distance from nozzle 256 by an upward force $F_u$ which is equal to the force $F_{A2}$ created by arc air under pressure acting against reaction area A2 on the underside of piston member 252. Such upward displacement is against the force of spring 264 and operating air under pressure acting against the reaction surface A1 on the upper side of piston member 252 is adapted to provide a force $F_{A1}$ which supplements the force of spring 264 to provide a pre-determined downward force $F_D$ against the piston member for the reasons set forth hereinafter. In this embodiment, the reaction area A1 for the upper surface of piston member 252 for such operating air under pressure is defined by a bellows component 266 which, advantageously, seals against leakage of operating air while providing for the downward displacing force to be independent of any force required to overcome frictional sealing engagement between the piston member and cylindrical component 254. The arrangement in this embodiment advantageously provides for a pre-determined downward force $F_D$ to be applied against piston 252 which enables the latter to be displaced downwardly from its operative position to its position contacting nozzle 256 without having to interrupt the flow of arc gas to chamber 262. Preferably, such downward force $F_D$ as defined by the force $F_s$ of spring 264 and the force $F_{A2}$ created by operating air pressure acting against area A1 of the upper surface of piston 252 within bellows 266 is at least 1.5 times greater than the upward force $F_u$ which is the force $F_{A2}$ created by the pressure of arc air acting against reaction surface A2 on the underside of piston 252.

It will be appreciated from FIG. 12 and the above description that force $F_s$ plus force $F_{A1}$ provides pre-determined downward force $F_D$ for engaging electrode 250 against nozzle 256 against the upward or opening force $F_u$ provided by force $F_{A2}$. In order for arc air under pressure to displace piston 252 upwardly from the position shown in FIG. 12 to the operative position of the electrode in connection with generating a pilot arc, force $F_{A2}$ must be greater than the spring force $F_s$. Similarly, for the downward force $F_D$ to displace the electrode back to its position contacting nozzle 256 without interrupting the flow of arc air to chamber 262, the combination of forces $F_{A2}$ and $F_s$ must be greater than the upward force $F_{A2}$. As mentioned above, it is preferred that $F_{A2}$ plus $F_s$ is at least 1.5 times greater than $F_{A2}$. This relationship is achieved with the example which accompanies FIG. 12 and in which the spring force $F_s$ has a value of 1, $F_{A1}$ has a value of 5 and $F_{A2}$ has a value of 3. In this example, the desired relationship is 6 to 3 whereby the downward force $F_D$ is twice the upper force $F_u$.

Figure 13:
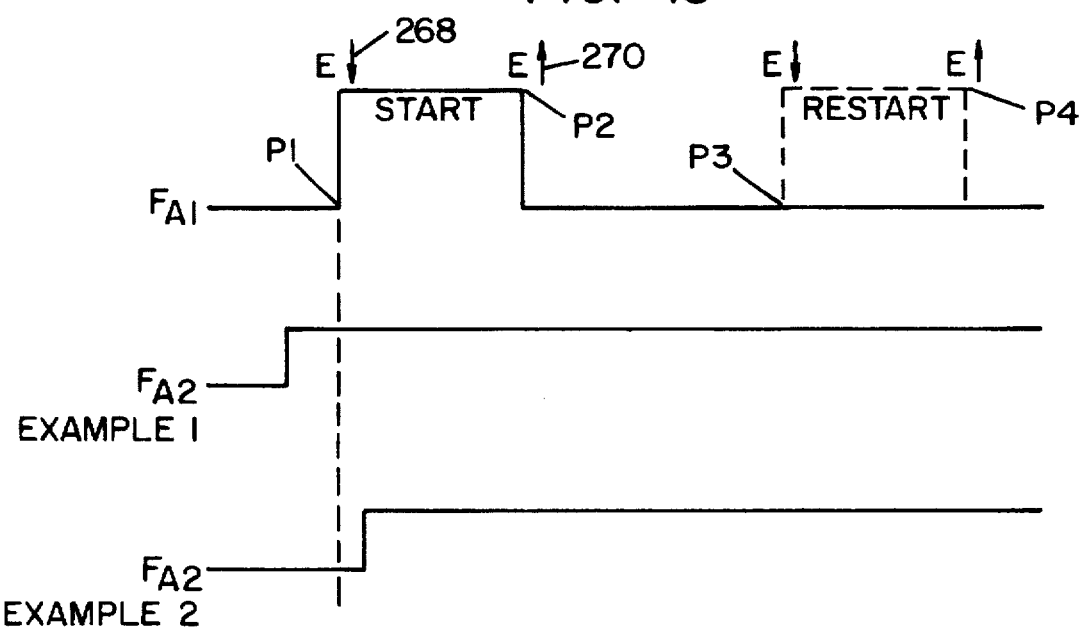
FIG. 13 is a pattern graph illustrating force and arc gas flow characteristics applicable to the arrangement shown in FIG. 12.

FIG. 13 is a force pattern graph depicting the manner in which force $F_{A1}$ is employed in conjunction with starting and restarting the torch, and further depicting the selectivity with respect to the time or point at which the flow of arc air to chamber 262 is initiated. With the component parts in the position shown in FIG. 12, electrode 250 is biased downwardly by spring force $F_s$ and, prior to starting operation of the torch such as by depressing the torch trigger, operating air under pressure is not introduced into bellows 266. Accordingly, referring to pattern line $F_{A1}$, prior to starting of the torch force $F_{A1}$ is zero. Starting of the torch is initiated at point P1 and, at this point, operating air under pressure is introduced to bellows 266 whereby force $F_{a1}$ is imposed on piston 252 together with spring force $F_s$ to apply a pre-determined downward force on electrode 250 as indicated by arrow 268. This downward force moves electrode 250 into contact with nozzle 256 and the force of engagement provides a cleaning function as described herein as well as promoting good electrical contact between the electrode and nozzle.

As shown by pattern lines $F_{A2}$ in Example 1 and Example 2 in FIG. 13, the flow of arc air into chamber 262 can either precede or follow the initiating of the starting procedure at point P1. As will be appreciated from the description herein of the various forces, force $F_{A2}$ is less than the downward force $F_D$, whereby in Example 1 the downward force will override the upward force to displace electrode 250 into contact with nozzle 256. In Example 2, the flow of arc air to chamber 262 after the application of the downward force $F_D$ will have no effect with respect to displacing electrode 250 upwardly.

At point P2, operating air under pressure in bellows 266 is exhausted therefrom, whereby force $F_{A1}$ drops back to zero and force $F_{A2}$ created by arc air under pressure in chamber 262 is operable to displace piston 252 and thus electrode 250 upwardly from contact with nozzle 256 as indicated by arrow 270. Assuming the electrode and nozzle to be connected across an arc current source, a pilot arc is created when the electrode moves away from contact with the nozzle. Should the arc thereafter be unintentionally extinguished during operation of the torch, it will be appreciated from the foregoing description that operating air under pressure can be introduced into bellows 266 without interrupting the flow of arc air to chamber 262 or interrupting the arc current supply. Thus, at point P3 for example, operating air under pressure is introduced into bellows 266 whereupon force $F_{A1}$ increases to its pre-determined value and electrode 250 is displaced downwardly to contact nozzle 256. At point P4 the operating air in bellows in 266 is exhausted whereupon force $F_{A1}$ returns to zero, the arc gas in chamber 262 displaces electrode 250 upwardly from contact with nozzle 256 and a pilot arc is generated between the electrode and nozzle to restart the torch. As with the previous embodiments described herein, it will be appreciated that electrode 250 can be sequentially displaced between its initial position and its operative position relative to nozzle 256 any number of times in conjunction with a cleaning operation and/or a start up safety check.

Figure 14:
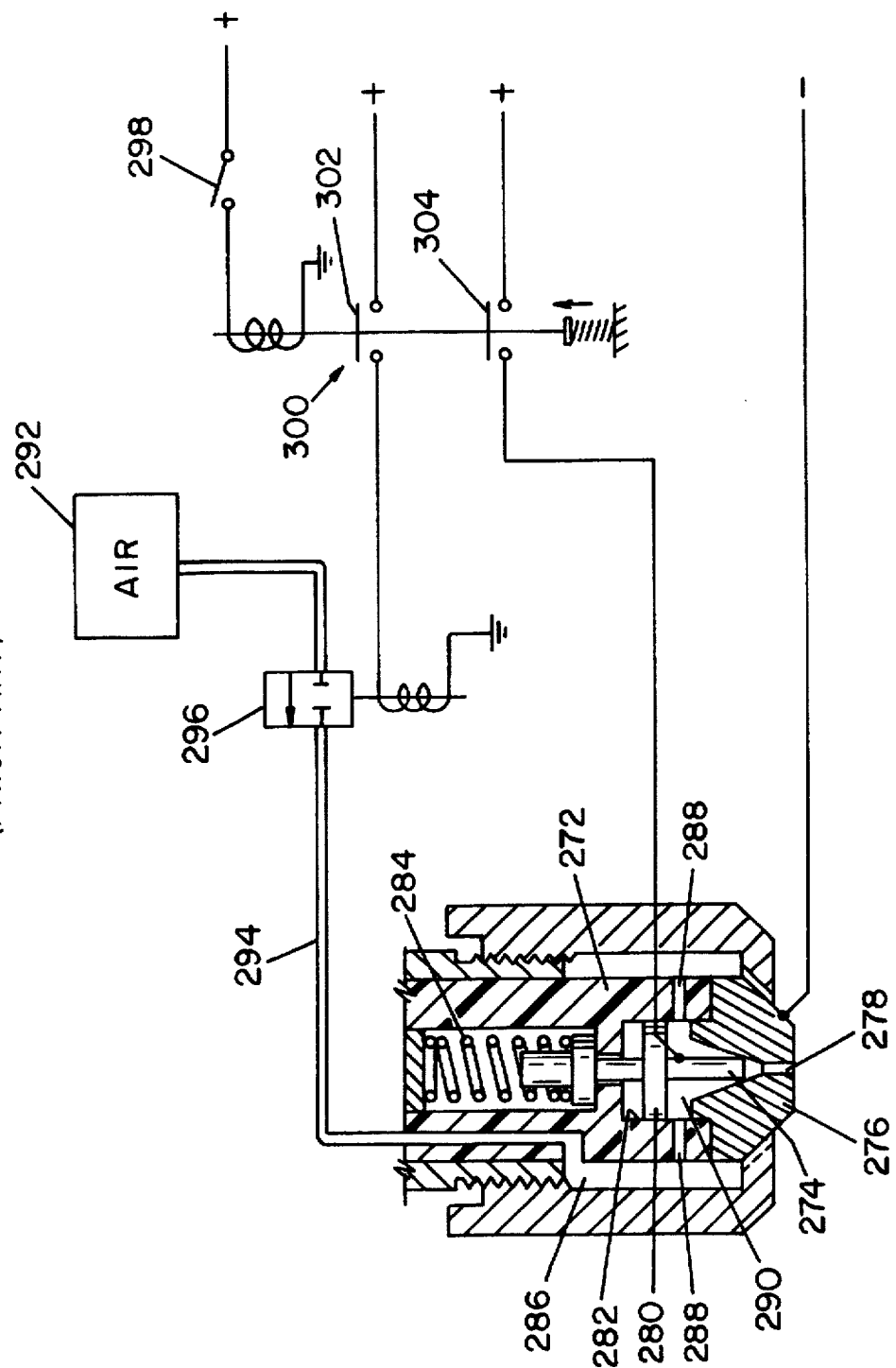
FIG. 14 is a sectional elevation view illustrating a plasma arc torch electrode and nozzle arrangement according to the prior art.

It is believed that the improved operating characteristics and the advantages achieved through the relative displacement between the electrode and nozzle of a plasma arc torch in accordance with the present invention will be more fully understood from the following description of a prior art arrangement illustrated in FIG. 14 of the drawings. With reference to the latter figure, the plasma arc torch comprises a generally cylindrical body member 272, an electrode 274, and a nozzle 276 having a plasma outlet opening 278 therein. Electrode 276 includes a piston member 280 axially slidably received in a cylinder chamber 282 in body member 272, and the electrode is biased downwardly to its initial position contacting nozzle 276 by a compression spring 284. Arc gas under pressure is adapted to flow through a passageway 286 and swirl ports 288 to pilot arc chamber 290, and the inlet end of passageway 286 is connected to a source 292 of arc gas under pressure by a flow line 294 through which flow is controlled by a solenoid valve 296. The control circuitry for the torch includes a normally open trigger switch 298 which controls a normally open relay switch 300. Switch 300 includes a contact 302 for opening and closing an electrical circuit to the coil of solenoid valve 296, and a contact 304 for opening and closing a circuit for supplying arc current between electrode 274 and nozzle 276.

In operation, trigger switch 298 is closed whereby relay switch 300 is actuated to close the valve coil and arc current circuits, whereupon arc gas valve 296 opens for arc gas to flow to pilot arc chamber 290 and arc current is supplied between the electrode and nozzle. Arc gas under pressure in chamber 290 acts against the underside of piston 280 to displace electrode 274 upwardly from contact with nozzle 276 against the bias of spring 284. A pilot arc is generated as electrode 274 moves upwardly from contact with nozzle 276, and the arc gas under pressure in chamber 290 maintains the electrode in its upper position during operation of the torch. Should the arc be unintentionally extinguished during operation of the torch, both the supply of arc gas and the supply of arc current must be interrupted in order to restart the torch. In this respect, it is impossible to move electrode 274 back to its initial position contacting nozzle 276 without interrupting the flow of arc gas to pilot arc chamber 290, and such interruption of the arc gas flow requires opening of trigger switch 298 and thus opening of the arc current circuit. Accordingly, the cycle time for restarting the torch is undesirably increased in that the operator must wait for the air supply to shut off, for the power source to recover and for the air supply to come back on before the pilot arc can be restarted. Furthermore, because of the relatively small area on the underside of piston 280 available for generating the opening force, and the fact that such force is limited by the arc gas pressure, biasing spring 284 has to be of a relatively low force to assure appropriate displacement of the electrode to its operative position spaced from nozzle 276 and retention of the electrode in the operative position. Accordingly, when the upward force is removed, spring 284 does not bias electrode 274 into contact with nozzle 276 with sufficient force to assure the breaking of any oxide build up on the electrode and/or nozzle and to assure good electrical contact therebetween. Thus, the nozzle must be frequently removed and the electrode and nozzle cleaned of oxide build up in order to assure sufficient electrical contact between the electrode and nozzle to achieve generation of a starting arc.

While considerable emphasis has been placed herein on the embodiments illustrated and described, it will be appreciated that other embodiments can be devised and that the embodiments herein can be modified without departing from the principals of the invention. Accordingly, it is to be distinctly understood that the foregoing descriptive matter is to be interpreted merely as illustrative of the invention and not as a limitation.

We claim:

1. In a plasma torch comprising relatively displaceable electrode and nozzle means having first and second positions relative to one another in which said electrode respectively contacts said nozzle means and is spaced an operating distance from said nozzle means, said nozzle means providing a gas chamber having a plasma outlet opening, means for flowing gas into said chamber, means for flowing an arc current between said electrode and nozzle means, and means for relatively displacing said electrode and nozzle means between said first and second positions, whereby a starting arc is created as said electrode and nozzle means move from said first toward said second position, the improvement comprising: said means for relatively displacing said electrode and nozzle means including means selectively operable for relatively displacing said electrode and nozzle means from said second position toward said first position during the flow of gas into said chamber and independent of the flow of arc current between said electrode and nozzle means.

2. A torch according to claim 1, wherein said means for relatively displacing said electrode and nozzle means includes piston means displaceable in opposite directions relative to said nozzle means, said electrode being connected to said piston means for displacement therewith in said opposite directions, said piston means having opposite sides each facing in a different one of said opposite directions, one of said opposite directions moving said electrode from said second position toward said first position, and means for selectively applying an operating force against one of said opposite sides to displace said piston means in said one direction.

3. A torch according to claim 2, wherein said means for selectively applying an operating force includes means for selectively applying an operating fluid under pressure against said one side.

4. A torch according to claim 3, and means biasing said piston means in the other of said opposite directions.

5. A torch according to claim 3, wherein said means for selectively flowing an operating fluid includes means for selectively flowing operating fluid against the other of said opposite sides of said piston means to bias said piston means in the other of said opposite directions for moving said electrode from said first position toward said second position.

6. A torch according to claim 5, wherein said operating fluid acting against said one side imposes a force on said one side greater than the force imposed on said other side by said operating fluid acting thereagainst, thereby overriding said bias and moving said piston means in said one direction for moving said electrode from said second position toward said first position.

7. A torch according to claim 3, wherein said means for selectively flowing an operating fluid against said one side of said piston means includes a control chamber and valve means having first and second positions respectively connecting said control chamber to a source of said operating fluid under pressure and venting said chamber to atmosphere.

8. A torch according to claim 7, and tension spring means biasing said piston means in the other of said opposite directions.

9. A torch according to claim 7, wherein said means for flowing gas to said gas chamber includes first flow line means for connecting said gas chamber to a source of gas under pressure, and second flow line means between said first flow line means and said control chamber, said valve means being in said second flow line means.

10. A torch according to claim 9, wherein said electrode has a given diameter, and said one side of said piston means has a diameter more than twice said given diameter.

11. A torch according to claim 10, and spring means biasing said piston means in the other of said opposite directions.

12. A torch according to claim 3, wherein said electrode is connected to the other of said opposite sides of said piston means, spring means providing a spring force against said one side of said piston means for biasing said electrode toward said first position, means providing said one side with a first reaction surface area, said other side having a second reaction surface area, said means for flowing gas into said chamber including means for flowing said gas at a pressure against said second reaction surface to create an opening force thereagainst greater than said spring force for moving said electrode from said first to said second position, and said means for selectively flowing an operating fluid against one of said opposite sides including means for flowing said operating fluid at a pressure against said first reaction surface to create a closing force thereagainst, said closing force supplementing said spring force to move said electrode from said second to said first position against said opening force.

13. A torch according to claim 12, wherein said spring force and closing force together are at least 1.5 times said opening force.

14. A torch according to claim 12, wherein said one side of said piston means has a given area and said first reaction surface area is less than said given area.

15. A torch according to claim 12, wherein said means providing said one side with a first reaction surface area includes collapsible wall means sealingly connected to said one side.

16. A torch according to claim 15, wherein said collapsible wall means includes bellows means.

17. A torch according to claim 15, wherein said collapsible wall means encloses said spring means.

18. A torch according to claim 2, wherein said means for selectively applying an operating force against one of said opposite sides includes spring means.

19. A torch according to claim 2, wherein said electrode is connected to the other of said opposite sides of said piston means, said means for flowing gas into said chamber including means for flowing said gas under pressure against said other side of said piston means to create a first force for displacing said electrode from said first to said second position, and said means for selectively applying an operating force including means for applying a second force overriding said first force for moving said electrode from said second to said first position.

20. A torch according to claim 19, wherein said means for applying said second force includes electrically activated drive member means, and means including control means for activating and deactivating said drive member means.

21. A torch according to claim 20, wherein said means for activating and deactivating said drive member means includes solenoid means.

22. A torch according to claim 21, wherein said control means includes means for intermittently energizing and deenergizing said solenoid means.

23. A torch according to claim 2, wherein said means for selectively applying an operating force against one of said opposite sides of said piston means includes spring means, said electrode being on the other of said opposite sides, whereby said spring means biases said electrode from said second position to said first position, an operating fluid chamber separate from said gas chamber, said piston means being in said operating fluid chamber, valve means having first and second positions respectively connecting and disconnecting said fluid chamber with a source of operating fluid under pressure, said operating fluid in said first position applying a force against said other side of said piston means to move said electrode from said first to said second position against said operating force, and means to selectively shift said valve means between said first and second positions.

24. A torch according to claim 23, wherein said means to shift said valve means includes electrically operable solenoid means.

25. A torch according to claim 24, wherein said solenoid means includes a plunger connected to said valve means, said solenoid means having a deenergized mode in which said plunger positions said valve means in one of said first and second positions thereof and an energized mode in which said plunger positions said valve means in the other of said first and second positions thereof.

26. A torch according to claim 25, wherein said plunger positions said valve means in said first position thereof in said deenergized mode of said solenoid means.

27. A torch according to claim 26, and spring means biasing said valve means to said first position thereof.

28. A torch according to claim 1, wherein said means for relatively displacing said electrode and nozzle means comprises electrically operable solenoid means including plunger means displaceable in opposite directions relative to said nozzle means, said electrode being connected to said plunger means for movement therewith, said solenoid means having a deenergized mode in which said plunger means positions said electrode said spaced operating distance from said nozzle means and an energized mode in which said plunger positions said electrode in contact with said nozzle means, and means for selectively shifting said solenoid means between said deenergized mode and said energized mode.

29. A torch according to claim 28, wherein said solenoid means includes means for biasing said plunger means to position said electrode said spaced operating distance from said nozzle means in said deenergized mode.

30. In a plasma torch comprising relatively displaceable electrode and nozzle means having first and second positions relative to one another in which said electrode respectively contacts said nozzle means and is spaced an operating distance from said nozzle means, said nozzle means providing a gas chamber having a plasma outlet opening, means for flowing gas into said chamber, and means for creating a starting arc by relatively displacing said electrode and nozzle means from said first toward said second position, the improvement comprising: a system for controlling said means for creating a starting arc including means for creating a voltage across said electrode and said nozzle means, detecting means for detecting a closed circuit condition when said electrode and nozzle means are in said first position, and enabling means for enabling said means for creating a starting arc only if said detecting means detects a closed circuit condition when said electrode and nozzle means are in said first position.

31. A torch according to claim 30, wherein said detecting means includes means for detecting an open circuit condition when said electrode and nozzle means are in said second position, means for sequentially displacing said electrode and nozzle means from one of said first and second positions to the other, and said enabling means enabling said means for creating a starting arc only if said detecting means detects a sequence of open and closed circuit conditions corresponding to said one and said other positions.

32. A torch according to claim 31, wherein said one position is an initial position and said means for enabling includes means for disabling said means for creating a starting arc when said detecting means does not detect the one of said open and closed circuit conditions corresponding to said initial position.

33. A torch according to claim 31, wherein said means for sequentially displacing said electrode and nozzle means includes means for holding said electrode and nozzle means in each of said first and second positions for a predetermined period of time.

34. A torch according to claim 31, wherein said means for sequentially displacing said electrode and said nozzle means comprises drive means including first drive means for relatively displacing said electrode and nozzle means from said first position to said second position and second drive means for relatively displacing said electrode and nozzle means from said second position to said first position, and control means responsive to said detecting means for controlling operation of said drive means.

35. A torch according to claim 34, wherein said control means is responsive to said detecting means detecting a closed circuit condition in said first position of said electrode and nozzle means to actuate said drive means for said first drive means to relatively displace said electrode and nozzle means to said second position and is responsive to said detecting means detecting an open circuit condition in said second position of said electrode and nozzle means to actuate said drive means for said second drive means to relatively displace said electrode and nozzle means to said first position.

36. A torch according to claim 35, wherein said means for creating a starting arc includes power supply means, said second position of said electrode and nozzle means being an initial position, and said control means being responsive to said detecting means detecting a closed circuit condition in said first position of said electrode and nozzle means to cause an arcing voltage to be applied between said electrode and nozzle means from said power supply means and to actuate said drive means for said first drive means to relatively displace said electrode and nozzle means back to said second position for creating said starting arc.

37. A torch according to claim 36, wherein said electrode and nozzle means are in an electrical circuit connected to said power supply means, switch means for opening and closing said circuit, and said control means including means for opening said switch means when said detecting means fails to detect either one of an open circuit condition in said initial position of said electrode and nozzle means and a closed circuit condition in said first position thereof.

38. A torch according to claim 37, wherein said control means includes means for delaying actuation of said drive means for a predetermined period of time in each of said first and second positions of said electrode and nozzle means.

39. A torch according to claim 35, wherein said means for creating a starting arc includes power source means, said first position of said electrode and nozzle means being an initial position, said control means being responsive to said detecting means detecting an open circuit condition in said second position of said electrode and nozzle means to actuate said drive means for said second drive means to relatively displace said electrode and nozzle means back to said first position and to cause an arcing voltage to be applied between said electrode and nozzle means from said power source and to thereafter actuate said drive means for said first drive means to relatively displace said electrode and nozzle means back to said second position for creating said starting arc.

40. A torch according to claim 39, wherein said electrode and nozzle means are in an electrical circuit connected to said power supply means, switch means for opening and closing said circuit, and said control means including means for opening said switch means when said detecting means fails to detect either one of a closed circuit condition in said initial position of said electrode and nozzle means and an open circuit condition in said second position thereof.

41. A torch according to claim 40, wherein said control means includes means for delaying actuation of said drive means for a pre-determined period of time in each of said first and second positions of said electrode and nozzle means.

42. A torch according to claim 35, wherein said control means includes means for delaying actuation of said drive means for a pre-determined period of time in each of said first and second positions of said electrode and nozzle means.

43. A method of testing a plasma torch prior to starting thereof, said torch comprising relatively displaceable electrode and nozzle members having first and second positions relative to one another in which said electrode respectively contacts said nozzle and is spaced an operating distance from said nozzle, said method comprising: applying a test voltage between said electrode and nozzle, sensing for a closed circuit condition when said electrode and nozzle are in said first position, and enabling creating a starting arc between said electrode and nozzle only when a closed circuit condition is sensed with said electrode and nozzle in said first position.

44. The method according to claim 43, including the further steps of sequentially displacing said electrode and nozzle from one of said first and second positions to the other, sensing for an open circuit condition when said electrode and nozzle are in said second position, and enabling creating a starting arc between said electrode and nozzle only when a sequence of open and closed circuit conditions corresponding to said one and said other position of said electrode and nozzle is sensed.

45. The method according to claim 44, and sensing for each said closed and open circuit condition for a pre-determined period of time.

46. The method according to claim 44, wherein said nozzle member provides a gas chamber having a plasma opening, and said method further includes flowing an arc gas to said gas chamber.

47. The method according to claim 46, wherein the flow of arc gas is initiated prior to sequentially displacing said electrode and nozzle.

48. The method according to claim 46, wherein the flow of arc gas is initiated concurrently with initiating sequential displacement of said electrode and nozzle.

49. The method according to claim 46, wherein the flow of arc gas is initiated after initiating sequential displacement of said electrode and nozzle.

50. The method according to claim 44, further including the step of applying a predetermined engaging force between said electrode and nozzle in said first position thereof.

51. The method according to claim 43, further including the step of applying a predetermined engaging force between said electrode and nozzle in said first position thereof.

52. The method according to claim 43, and sensing for said closed circuit condition for a pre-determined period of time.

53. The method according to claim 43, wherein said first position is an initial position, and including the additional steps of relatively displacing said electrode and nozzle from said initial position to said second position, sensing for an open circuit condition when said electrode and nozzle are in said second position, relatively displacing said electrode and nozzle from said second position back to said initial position, and enabling creating a starting arc when an open circuit condition is sensed in said second position followed by a closed circuit condition being sensed in said initial position.

54. The method according to claim 53, and sensing for a closed circuit condition when said electrode and nozzle are in said initial position prior to relative displacement thereof to said second position.

55. The method according to claim 54, and sensing for each said closed and open circuit condition for a pre-determined period of time.

56. The method according to claim 43, wherein said second position is an initial position, and relatively displacing said electrode and nozzle from said initial position to said first position, and then sensing for said closed circuit condition in said first position.

57. The method according to claim 56, and sensing for an open circuit condition when said electrode and nozzle are in said initial position prior to relative displacement thereof to said first position.

58. The method according to claim 43, wherein said second position is an initial position, and including the further steps of sequentially relatively displacing said electrode and nozzle from said initial position to said first position and back to said initial position at least twice, sensing for an open circuit condition each time said electrode and nozzle are in said initial position, sensing for a closed circuit condition each time said electrode and nozzle are in said first position, and enabling creating of a starting arc when a continuous sequence of open and closed circuits is sensed during the sequential relative displacement of said electrode and nozzle.

59. The method according to claim 43, wherein one of said first and second positions of said electrode and nozzle is an initial position, and including the further steps of relatively displacing said electrode and nozzle between said initial position and the other of said first and second positions a pre-determined number of times to a final position in which said electrode and nozzle are in said first position, sensing for a closed circuit condition each time said electrode and nozzle are in said first position, and enabling creating of a starting arc when a closed circuit condition is sensed in said final position of said electrode and nozzle.

60. The method according to claim 59, and sensing for an open circuit condition each time said electrode and nozzle are in said second position, and enabling creating of a starting arc only when said sensed closed circuit condition in said final position is precluded by a sensed open circuit condition in the second position of said electrode and nozzle immediately preceding said final position.

61. The method according to claim 59, and sensing for an open circuit condition each time said electrode and nozzle are in said second position, and enabling creating of a starting arc only when said sensed closed circuit condition in said final position is preceded by a continuous sequence of open and closed circuit conditions sensed during the relative displacement of said electrode and nozzle between said initial and other positions.

62. In a plasma torch comprising relatively displaceable electrode and nozzle means having first and second positions relative to one another in which said electrode respectively contacts said nozzle means and is spaced an operating distance from said nozzle means, said nozzle means providing a gas chamber having a plasma outlet opening, means for flowing arc gas into said chamber, means for flowing an arc current between said electrode and nozzle means, and means for relatively displacing said electrode and nozzle means between said first and second positions, whereby a starting arc is created as said electrode and nozzle means move from said first toward said second position, the improvement comprising: means for creating a first force for holding said electrode and nozzle means in said second position, and means for selectively creating a second force for overriding said first force and relatively displacing said electrode and nozzle means from said second position to said first position against said first force.

63. A torch according to claim 62, wherein said means for relatively displacing said electrode and nozzle means includes piston means displaceable in opposite directions relative to said nozzle means and having opposite sides, said electrode being connected to one of said opposite sides of said piston means for displacement therewith in said opposite directions, and said means for selectively creating said second force including means for imposing said second force against the other of said opposite sides of said piston means.

64. A torch according to claim 63, wherein said means for selectively creating said second force includes means for selectively applying fluid under pressure against the other of said opposite sides of said piston means.

65. A torch according to claim 63, wherein said means for creating said first force includes spring means.

66. A torch according to claim 63, wherein said means for creating said first force includes means for applying fluid under pressure against said one side of said piston means.

67. A torch according to claim 63, wherein said means for selectively creating said second force includes chamber means for said piston means, said other side of said piston means being in said chamber means, and valve means having first and second positions respectively connecting said chamber means to a source of fluid under pressure and venting said chamber means to atmosphere.

68. A torch according to claim 67, wherein said means for creating said first force includes tension spring means connected to said other side of said piston means.

69. A torch according to claim 67, wherein said means for flowing arc gas to said gas chamber includes first flow line means for connecting said gas chamber to a source of arc gas under pressure, and second flow line means between said first flow line means and said chamber means for said piston means, said valve means being in said second flow line means.

70. A torch according to claim 69, wherein said electrode has a given diameter, and said other side of said piston means has a diameter more than twice said given diameter.

71. A torch according to claim 63, wherein said means for selectively creating said second force includes means for selectively applying fluid under pressure against the other of said opposite sides of said piston means, and spring means providing a spring force against said other side of said piston means.

72. A torch according to claim 71, wherein said means for creating said first force includes means for flowing arc gas into said gas chamber against said one side of said piston means, said first force being greater than said spring force.

73. A torch according to claim 72, wherein said second force is at least 1.5 times said first force.

74. A torch according to claim 72, wherein said other side of said piston means has a given area, and means providing said other side with a reaction surface having an area less than said given area.

75. A torch according to claim 74, wherein said means providing said other side with a reaction surface includes collapsible wall means sealingly connected to said other side.

76. A torch according to claim 75, wherein said collapsible wall means includes bellows means.

77. A torch according to claim 75, wherein said collapsible wall means encloses said spring means.

78. A torch according to claim 63, wherein said means for flowing arc gas into said gas chamber includes means for flowing said arc gas under pressure against said one side of said piston means to create said first force.

79. A torch according to claim 78, wherein said means for selectively creating said second force includes electrically activated drive member means, and means including control means for activating and deactivating said drive member means.

80. A torch according to claim 79, wherein said means for activating and deactivating said drive member means includes electrical coil means.

81. A torch according to claim 80, wherein said control means includes means for intermittently energizing and deenergizing said coil means.

82. A torch according to claim 62, wherein said means for relatively displacing said electrode and nozzle means comprises electrically operable solenoid means including plunger means displaceable in opposite directions relative to said nozzle means, said electrode being connected to said plunger means for movement therewith, said solenoid means having a deenergized mode in which said plunger means positions said electrode in said second position and an energized mode in which said plunger means positions said electrode in said first position, and said solenoid means including said means for creating said first force and said means for creating said second force.

83. A torch according to claim 82, wherein said means for creating said first force includes means for biasing said plunger means to position said electrode in said second position in said deenergized mode of said solenoid means.

84. A torch according to claim 83, wherein said solenoid means includes electric coil means for displacing said plunger means in said energized mode of said solenoid means, said coil means and plunger means providing said means for creating said second force.

\* \* \* \* \*